United States Patent
Zhang et al.

(10) Patent No.: US 11,432,334 B2
(45) Date of Patent: Aug. 30, 2022

(54) TECHNIQUES RELATED TO RANDOM ACCESS CHANNEL OPERATION

(71) Applicant: QUALCOMM Incorporated, San Diego, CA (US)

(72) Inventors: Xiaoxia Zhang, San Diego, CA (US); Yisheng Xue, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/811,207

(22) Filed: Mar. 6, 2020

(65) Prior Publication Data
US 2020/0305202 A1 Sep. 24, 2020

Related U.S. Application Data

(60) Provisional application No. 62/822,576, filed on Mar. 22, 2019.

(51) Int. Cl.
*H04W 74/08* (2009.01)
*H04W 72/04* (2009.01)
*H04W 76/10* (2018.01)

(52) U.S. Cl.
CPC ....... *H04W 74/0833* (2013.01); *H04W 72/04* (2013.01); *H04W 76/10* (2018.02)

(58) Field of Classification Search
CPC .. H04W 72/04; H04W 76/10; H04W 74/0833
See application file for complete search history.

(56) References Cited

U.S. PATENT DOCUMENTS

2015/0358984 A1* 12/2015 Uchino ............. H04W 28/0252
370/329
2018/0279191 A1* 9/2018 Zhang ............... H04W 36/0085
(Continued)

OTHER PUBLICATIONS

International Search Report and Written Opinion—PCT/US2020/021703—ISAEPO—dated Jul. 20, 2020.
(Continued)

*Primary Examiner* — Brian D Nguyen
(74) *Attorney, Agent, or Firm* — Holland & Hart LLP/Qualcomm

(57) ABSTRACT

This disclosure describes methods, devices, and systems for techniques related to random access channel (RACH) operation. A user equipment (UE) may establish a connection with a base station using a random access procedure. Based on a transmission priority or a network parameter, the random access procedure may be a two-step random access procedure or a four-step random access procedure. The described techniques may support physical layer procedures, including resource configurations and communication schemes that may support enhanced signaling capacity. In some examples, the described techniques may include signaling characteristics and resource mappings for two-step random access procedure based on a transmission priority. In other examples, the described techniques may include antenna techniques associated with a four-step random access procedure. The physical layer procedures may include features for improved data rates, increased spectral efficiency and, in some examples, may promote low latency communication associated with random access, among other advantages.

30 Claims, 22 Drawing Sheets

(56) References Cited

U.S. PATENT DOCUMENTS

| | | | |
|---|---|---|---|
| 2018/0368179 A1* | 12/2018 | He | H04W 74/008 |
| 2020/0389879 A1* | 12/2020 | Zhang | H04L 5/0092 |
| 2021/0212129 A1* | 7/2021 | Zhang | H04W 52/146 |
| 2021/0219348 A1* | 7/2021 | Zhang | H04W 80/02 |
| 2021/0227594 A1* | 7/2021 | Lee | H04W 24/08 |
| 2021/0243818 A1* | 8/2021 | Lee | H04W 24/08 |
| 2021/0266982 A1* | 8/2021 | Guo | H04W 74/004 |

OTHER PUBLICATIONS

LG Electronics: "Discussion on 2step RACH Procedure", 3GPP Draft, 3GPP TSG RAN WG1 Meeting #96, R1-1902534 LG_Discussion on 2step RACH Procedure_FINAL, 3rd Generation Partnership Project (3GPP), Mobile Competence Centre, 650, Route Des Lucioles, F-06921 Sophia-Antipolis Cedex, FRA, vol. RAN WG1, No. Athens, Greece, Feb. 12, 2019-Feb. 16, 2019, Feb. 16, 2019 (Feb. 16, 2019), XP051600230, 6 Pages, Retrieved from the Internet: URL: http://www.3gpp.org/ftp/tsg%5Fran/WG1%5FRL1/TSGR1%5F96/Docs/R1%2D1902534%2Ezip, [retrieved on Feb. 16, 2019], p. 1-p. 6.

Partial International Search Report—PCT/US2020/021703—ISAEPO—May 29, 2020.

* cited by examiner

TECHNIQUES RELATED TO RANDOM ACCESS CHANNEL OPERATION

CROSS REFERENCE

The present Application for Patent claims the benefit of U.S. Provisional Patent Application No. 62/822,576 by ZHANG et al., entitled "TECHNIQUES RELATED TO RANDOM ACCESS CHANNEL OPERATION," filed Mar. 22, 2019, assigned to the assignee hereof, and expressly incorporated by reference herein.

BACKGROUND

The following relates generally to wireless communications, and more specifically to techniques related to random access channel (RACH) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless communications system may include a number of base stations or network access nodes, each simultaneously supporting communication for multiple communication devices, which may be otherwise known as user equipment (UE). Some wireless communications systems may support one or more random access procedures for communication between a UE and a base station. The random access procedures may involve a series of messages exchanged between the UE and the base station.

As demand for communication access increases, particularly for high priority transmissions, it may be desirable for a wireless communications system to target low latencies for random access operation. Additionally, wireless communication devices may seek improved reliability for random access message transmissions on the channel. In some examples, however, some physical layer procedures may fail to provide signaling capacity and robustness for enhanced RACH operation, including support for increased data rates and spectral efficiency across transmission. Improved techniques and systems are desired.

SUMMARY

The described techniques relate to improved methods, systems, devices, and apparatuses that support techniques related to random access channel (RACH) operation. Generally, the described techniques support physical layer procedures, including resource configurations and communication schemes that support enhanced signaling capacity for random access. In some examples, the described techniques may include signaling characteristics and resource mapping for two-step random access procedures that may be based on a transmission priority. In other examples, the described techniques may include antenna techniques that promote spectral efficiency, range, and signaling diversity associated with a four-step random access procedure. The physical layer procedures may include features for improved data rates, increased spectral efficiency and, in some examples, may promote low latency communication associated with random access, among other benefits.

A method of wireless communication at a user equipment (UE) is described. The method may include determining a transmit priority for a first random access message of a random access procedure based on whether the first random access message spans a set of orthogonal frequency division multiplexing symbols that is less than a first threshold or includes information having a priority above a second threshold, transmitting, to a base station, the first random access message based on the transmit priority, the first random access message including a random access preamble and a connection request, and monitoring a downlink channel to receive a second random access message based on the first random access message, the second random access message including information for establishing a connection between the UE and the base station.

An apparatus for wireless communication at a UE is described. The apparatus may include a processor, memory in electronic communication with the processor, and instructions stored in the memory. The instructions may be executable by the processor to cause the apparatus to determine a transmit priority for a first random access message of a random access procedure based on whether the first random access message spans a set of orthogonal frequency division multiplexing symbols that is less than a first threshold or includes information having a priority above a second threshold, transmit, to a base station, the first random access message based on the transmit priority, the first random access message including a random access preamble and a connection request, and monitor a downlink channel to receive a second random access message based on the first random access message, the second random access message including information for establishing a connection between the UE and the base station.

Another apparatus for wireless communication at a UE is described. The apparatus may include means for determining a transmit priority for a first random access message of a random access procedure based on whether the first random access message spans a set of orthogonal frequency division multiplexing symbols that is less than a first threshold or includes information having a priority above a second threshold, transmitting, to a base station, the first random access message based on the transmit priority, the first random access message including a random access preamble and a connection request, and monitoring a downlink channel to receive a second random access message based on the first random access message, the second random access message including information for establishing a connection between the UE and the base station.

A non-transitory computer-readable medium storing code for wireless communication at a UE is described. The code may include instructions executable by a processor to determine a transmit priority for a first random access message of a random access procedure based on whether the first random access message spans a set of orthogonal frequency division multiplexing symbols that is less than a first threshold or includes information having a priority above a second threshold, transmit, to a base station, the first random access message based on the transmit priority, the first random access message including a random access preamble and a connection request, and monitor a downlink channel to receive a second random access message based on the first random access message, the second random access message including information for establishing a connection between the UE and the base station.

Some examples of the method, apparatuses, and non-transitory computer-readable medium described herein may further include operations, features, means, or instructions for determining that the first random access message spans the set of orthogonal frequency division multiplexing symbols that may be less than the first threshold, where determining the transmit priority for the first random access message may be based on determining that the first random access message spans the set of orthogonal frequency division multiplexed symbols.

In some examples of the method, apparatuses, and non-transitory computer-readable medium described herein, a combination of the random access preamble and the connection request span the set of orthogonal frequency division multiplexed symbols.

In some examples of the method, apparatuses, and non-transitory computer-readable medium described herein, a combination of the random access preamble, a gap period spanning a duration, and the connection request span the set of orthogonal frequency division multiplexed symbols.

Some examples of the method, apparatuses, and non-transitory computer-readable medium described herein may further include operations, features, means, or instructions for determining that the first random access message includes information having the priority above the second threshold based on one or more of: a preamble partition, a RACH occasion, or a signaling indication by the base station, where determining the transmit priority for the first random access message may be based on determining the first random access message includes information above the second threshold.

In some examples of the method, apparatuses, and non-transitory computer-readable medium described herein, determining the transmit priority for the first random access message further may include operations, features, means, or instructions for determining a first transmit priority for the random access preamble, and determining a second transmit priority for the connection request based on a data payload in the connection request.

In some examples of the method, apparatuses, and non-transitory computer-readable medium described herein, the first transmit priority corresponds to a highest configured transmit power of a transmit power allocation, and where the second transmit priority corresponds to a second transmit power of the transmit power allocation that may be lower than the highest configured transmit power.

In some examples of the method, apparatuses, and non-transitory computer-readable medium described herein, the data payload includes one or more of hybrid automatic repeat request acknowledgement information, a scheduling request, or channel state information.

In some examples of the method, apparatuses, and non-transitory computer-readable medium described herein, the transmit priority for the first random access message corresponds to a highest configured transmit power of a transmit power allocation.

In some examples of the method, apparatuses, and non-transitory computer-readable medium described herein, the first threshold corresponds to a set of orthogonal frequency division multiplexing symbols and the second threshold corresponds to a transmit priority of a transmit power allocation.

In some examples of the method, apparatuses, and non-transitory computer-readable medium described herein, the second random access message includes a random access response and a connection setup message for the random access procedure.

In some examples of the method, apparatuses, and non-transitory computer-readable medium described herein, the random access procedure may be a two-step random access procedure.

A method of wireless communication at a UE is described. The method may include determining a random access preamble for a first random access message of a random access procedure, the first random access message associated with a random access occasion and a transmission priority, transmitting, to a base station based on the determining, the first random access message of a random access procedure, the first random access message including the random access preamble and indicating a timing configuration for a response window of a downlink channel, and monitoring the response window to receive a second random access message including information for establishing a connection between the UE and the base station.

An apparatus for wireless communication at a UE is described. The apparatus may include a processor, memory in electronic communication with the processor, and instructions stored in the memory. The instructions may be executable by the processor to cause the apparatus to determine a random access preamble for a first random access message of a random access procedure, the first random access message associated with a random access occasion and a transmission priority, transmit, to a base station based on the determining, the first random access message of a random access procedure, the first random access message including the random access preamble and indicating a timing configuration for a response window of a downlink channel, and monitor the response window to receive a second random access message including information for establishing a connection between the UE and the base station.

Another apparatus for wireless communication at a UE is described. The apparatus may include means for determining a random access preamble for a first random access message of a random access procedure, the first random access message associated with a random access occasion and a transmission priority, transmitting, to a base station based on the determining, the first random access message of a random access procedure, the first random access message including the random access preamble and indicating a timing configuration for a response window of a downlink channel, and monitoring the response window to receive a second random access message including information for establishing a connection between the UE and the base station.

A non-transitory computer-readable medium storing code for wireless communication at a UE is described. The code may include instructions executable by a processor to determine a random access preamble for a first random access message of a random access procedure, the first random access message associated with a random access occasion and a transmission priority, transmit, to a base station based on the determining, the first random access message of a random access procedure, the first random access message including the random access preamble and indicating a timing configuration for a response window of a downlink channel, and monitor the response window to receive a second random access message including information for establishing a connection between the UE and the base station.

Some examples of the method, apparatuses, and non-transitory computer-readable medium described herein may further include operations, features, means, or instructions for receiving, from the base station, an indication of a capability of the base station for communication, the communication having a transmit priority above a threshold, where the determining may be based on the indication of the capability of the base station.

In some examples of the method, apparatuses, and non-transitory computer-readable medium described herein, the first random access message includes a connection request and the random access preamble, the random access preamble including the timing configuration.

In some examples of the method, apparatuses, and non-transitory computer-readable medium described herein, the first random access message includes the random access preamble and a connection request including the timing configuration.

In some examples of the method, apparatuses, and non-transitory computer-readable medium described herein, the first random access message associated with the random access occasion includes information supporting fallback from the random access procedure to an alternative random access procedure.

In some examples of the method, apparatuses, and non-transitory computer-readable medium described herein, the random access procedure may be a two-step random access procedure and the alternative random access procedure may be a four-step random access procedure.

In some examples of the method, apparatuses, and non-transitory computer-readable medium described herein, the second random access message includes a random access response and a connection setup message for the random access procedure.

A method of wireless communication at a base station is described. The method may include transmitting, to a UE, an indication of a capability of the base station for communication, the communication having a transmit priority above a threshold, receiving, from the UE based on the indication, a first random access message of a random access procedure, the first random access message indicating a timing configuration for a response window of a downlink channel, and transmitting, to the UE during the response window, a second random access message including information for establishing a connection between the UE and the base station.

An apparatus for wireless communication at a base station is described. The apparatus may include a processor, memory in electronic communication with the processor, and instructions stored in the memory. The instructions may be executable by the processor to cause the apparatus to transmit, to a UE, an indication of a capability of the base station for communication, the communication having a transmit priority above a threshold, receive, from the UE based on the indication, a first random access message of a random access procedure, the first random access message indicating a timing configuration for a response window of a downlink channel, and transmit, to the UE during the response window, a second random access message including information for establishing a connection between the UE and the base station.

Another apparatus for wireless communication at a base station is described. The apparatus may include means for transmitting, to a UE, an indication of a capability of the base station for communication, the communication having a transmit priority above a threshold, receiving, from the UE based on the indication, a first random access message of a random access procedure, the first random access message indicating a timing configuration for a response window of a downlink channel, and transmitting, to the UE during the response window, a second random access message including information for establishing a connection between the UE and the base station.

A non-transitory computer-readable medium storing code for wireless communication at a base station is described. The code may include instructions executable by a processor to transmit, to a UE, an indication of a capability of the base station for communication, the communication having a transmit priority above a threshold, receive, from the UE based on the indication, a first random access message of a random access procedure, the first random access message indicating a timing configuration for a response window of a downlink channel, and transmit, to the UE during the response window, a second random access message including information for establishing a connection between the UE and the base station.

In some examples of the method, apparatuses, and non-transitory computer-readable medium described herein, the first random access message includes a connection request and a random access preamble, the random access preamble including the timing configuration.

In some examples of the method, apparatuses, and non-transitory computer-readable medium described herein, the first random access message includes a random access preamble and a connection request including the timing configuration.

A method of wireless communication at a UE is described. The method may include determining a random access preamble for a first random access message of a random access procedure, the first random access message associated with a random access occasion and a transmission priority, identifying a set of physical uplink shared channel resources corresponding to the random access preamble based on determining the random access preamble, the set of physical uplink shared channel resources based on a time-varying mapping, and transmitting, to a base station on the set of physical uplink shared channel resources, a first random access message of a random access procedure, the first random access message including a connection request and the random access preamble.

An apparatus for wireless communication at a UE is described. The apparatus may include a processor, memory in electronic communication with the processor, and instructions stored in the memory. The instructions may be executable by the processor to cause the apparatus to determine a random access preamble for a first random access message of a random access procedure, the first random access message associated with a random access occasion and a transmission priority, identify a set of physical uplink shared channel resources corresponding to the random access preamble based on determining the random access preamble, the set of physical uplink shared channel resources based on a time-varying mapping, and transmit, to a base station on the set of physical uplink shared channel resources, a first random access message of a random access procedure, the first random access message including a connection request and the random access preamble.

Another apparatus for wireless communication at a UE is described. The apparatus may include means for determining a random access preamble for a first random access message of a random access procedure, the first random access message associated with a random access occasion and a transmission priority, identifying a set of physical uplink shared channel resources corresponding to the random access preamble based on determining the random access preamble, the set of physical uplink shared channel resources based on a time-varying mapping, and transmitting, to a base station on the set of physical uplink shared channel resources, a first random access message of a random access procedure, the first random access message including a connection request and the random access preamble.

A non-transitory computer-readable medium storing code for wireless communication at a UE is described. The code may include instructions executable by a processor to determine a random access preamble for a first random access message of a random access procedure, the first random access message associated with a random access occasion and a transmission priority, identify a set of physical uplink shared channel resources corresponding to the random access preamble based on determining the random access preamble, the set of physical uplink shared channel resources based on a time-varying mapping, and transmit, to a base station on the set of physical uplink shared channel resources, a first random access message of a random access procedure, the first random access message including a connection request and the random access preamble.

Some examples of the method, apparatuses, and non-transitory computer-readable medium described herein may further include operations, features, means, or instructions for monitoring a downlink channel to receive a second random access message based on the first random access message, the second random access message including information for establishing a connection between the UE and the base station.

In some examples of the method, apparatuses, and non-transitory computer-readable medium described herein, the second random access message includes a random access response and a connection setup message for the random access procedure.

In some examples of the method, apparatuses, and non-transitory computer-readable medium described herein, identifying the set of physical uplink shared channel resources further may include operations, features, means, or instructions for determining, at a first time period based on the time-varying mapping, a first set of frequency resources associated with the random access occasion and a second set of frequency resources associated with the set of physical uplink shared channel resources, and determining, at a second time period based on the time-varying mapping, a third set of frequency resources associated with the random access occasion and a fourth set of frequency resources associated with the set of physical uplink shared channel resources.

In some examples of the method, apparatuses, and non-transitory computer-readable medium described herein, identifying the set of physical uplink shared channel resources further may include operations, features, means, or instructions for identifying a set of frequency resources associated with the random access occasion, determining, at a first time period based on the time-varying mapping, a first frequency offset for the set of physical uplink shared channel resources, the first frequency offset relative to the random access occasion, and determining, at a second time period based on the time-varying mapping, a second frequency offset for the set of physical uplink shared channel resources, the second frequency offset relative to the random access occasion.

In some examples of the method, apparatuses, and non-transitory computer-readable medium described herein, identifying the set of physical uplink shared channel resources further may include operations, features, means, or instructions for determining, at a first time period based on the time-varying mapping, a first set of physical uplink shared channel resources corresponding to the random access preamble, and determining, at a second time period based on the time-varying mapping, a second set of physical uplink shared channel resources corresponding to the random access preamble.

In some examples of the method, apparatuses, and non-transitory computer-readable medium described herein, the first set of physical uplink shared channel resources correspond to a first set of random access preambles that include the random access preamble, and where the second set of physical uplink shared channel resources correspond to a second set of random access preambles that include the random access preamble.

In some examples of the method, apparatuses, and non-transitory computer-readable medium described herein, the first set of physical uplink shared channel resources may be associated with a first set of demodulation reference signal ports, and where the second set of physical uplink shared channel resources may be associated with a second set of demodulation reference signal ports.

In some examples of the method, apparatuses, and non-transitory computer-readable medium described herein, the random access procedure may be a two-step random access procedure.

A method of wireless communication at a UE is described. The method may include transmitting, to a base station, a first random access message of a random access procedure, the first random access message including a random access preamble, receiving a second random access message based on the first random access message, the second random access message including an indication of a first set of physical uplink shared channel resources associated with the random access preamble and a second set of physical uplink shared channel resources associated with the random access preamble, and transmitting, to the base station based on the indication, a third random access message that is multiplexed with one or more additional random access message opportunities on resources of the first set of physical uplink shared channel or resources of the second set of physical uplink shared channel resources.

An apparatus for wireless communication at a UE is described. The apparatus may include a processor, memory in electronic communication with the processor, and instructions stored in the memory. The instructions may be executable by the processor to cause the apparatus to transmit, to a base station, a first random access message of a random access procedure, the first random access message including a random access preamble, receive a second random access message based on the first random access message, the second random access message including an indication of a first set of physical uplink shared channel resources associated with the random access preamble and a second set of physical uplink shared channel resources associated with the random access preamble, and transmit, to the base station based on the indication, a third random access message that is multiplexed with one or more additional random access message opportunities on resources of the first set of physical uplink shared channel or resources of the second set of physical uplink shared channel resources.

Another apparatus for wireless communication at a UE is described. The apparatus may include means for transmitting, to a base station, a first random access message of a random access procedure, the first random access message including a random access preamble, receiving a second random access message based on the first random access message, the second random access message including an indication of a first set of physical uplink shared channel resources associated with the random access preamble and a second set of physical uplink shared channel resources associated with the random access preamble, and transmitting, to the base station based on the indication, a third random access message that is multiplexed with one or more additional random access message opportunities on resources of the first set of physical uplink shared channel or resources of the second set of physical uplink shared channel resources.

A non-transitory computer-readable medium storing code for wireless communication at a UE is described. The code may include instructions executable by a processor to transmit, to a base station, a first random access message of a random access procedure, the first random access message including a random access preamble, receive a second random access message based on the first random access message, the second random access message including an indication of a first set of physical uplink shared channel resources associated with the random access preamble and a second set of physical uplink shared channel resources associated with the random access preamble, and transmit, to the base station based on the indication, a third random access message that is multiplexed with one or more additional random access message opportunities on resources of the first set of physical uplink shared channel or resources of the second set of physical uplink shared channel resources.

In some examples of the method, apparatuses, and non-transitory computer-readable medium described herein, the third random access message may be multiplexed with the one or more additional random access message opportunities that may be associated with a second UE based on a space-division multiple access procedure.

Some examples of the method, apparatuses, and non-transitory computer-readable medium described herein may further include operations, features, means, or instructions for determining a first set of demodulation reference signal ports associated with the third random access message on the first set of physical uplink shared channel resources, the first set of demodulation reference signal ports different from the demodulation reference signal ports associated with the one or more additional random access message opportunities on the first set of physical uplink shared channel resources.

In some examples of the method, apparatuses, and non-transitory computer-readable medium described herein, the first set of demodulation reference signal ports and the second set of demodulation reference signal ports may be different.

In some examples of the method, apparatuses, and non-transitory computer-readable medium described herein, the second random access message indicates a first index value corresponding to the first set of physical uplink shared channel resources and a second index value corresponding to the second set of physical uplink shared channel resources.

In some examples of the method, apparatuses, and non-transitory computer-readable medium described herein, the first set of demodulation reference signal ports and the second set of demodulation reference signal ports may be the same.

In some examples of the method, apparatuses, and non-transitory computer-readable medium described herein, the second random access message indicates the first set of physical uplink shared channel resources, and where the second random access message indicates the second set of physical uplink shared channel resources relative to the first set of physical uplink shared channel resources.

Some examples of the method, apparatuses, and non-transitory computer-readable medium described herein may further include operations, features, means, or instructions for determining a second set of demodulation reference signal ports associated with the third random access message on the second set of physical uplink shared channel resources, the second set of demodulation reference signal ports different from the demodulation reference signal ports associated with the one or more additional random access message opportunities the second set of physical uplink shared channel resources.

In some examples of the method, apparatuses, and non-transitory computer-readable medium described herein, the first set of physical uplink shared channel resources may be associated with a second random access preamble and the second set of physical uplink shared channel resources may be associated with the second random access preamble.

Some examples of the method, apparatuses, and non-transitory computer-readable medium described herein may further include operations, features, means, or instructions for receiving a fourth random access message based on the third random access message or the fourth random access message, the fourth random access message including a connection setup message for establishing a connection between the UE and the base station.

In some examples of the method, apparatuses, and non-transitory computer-readable medium described herein, the random access procedure may be a four-step random access procedure.

A method of wireless communication at a base station is described. The method may include receiving, from a UE, a first random access message of a random access procedure, the first random access message including a random access preamble, determining a format of a second random access message based on the first random access message, the second random access message including an indication of a first set of physical uplink shared channel resources associated with the random access preamble and a second set of physical uplink shared channel resources associated with the random access preamble, transmitting the second random access message based on the indication, and receiving, based on the second random access message, a third random access message from the UE, the third random access message multiplexed with a fourth random access message from a second UE on resources of the first set of physical uplink shared channel resources or resources of the second set of physical uplink shared channel resources.

An apparatus for wireless communication at a base station is described. The apparatus may include a processor, memory in electronic communication with the processor, and instructions stored in the memory. The instructions may be executable by the processor to cause the apparatus to receive, from a UE, a first random access message of a random access procedure, the first random access message including a random access preamble, determine a format of a second random access message based on the first random access message, the second random access message including an indication of a first set of physical uplink shared channel resources associated with the random access preamble and a second set of physical uplink shared channel resources associated with the random access preamble, transmit the second random access message based on the indication, and receive, based on the second random access message, a third random access message from the UE, the third random access message multiplexed with a fourth random access message from a second UE on resources of the first set of physical uplink shared channel resources or resources of the second set of physical uplink shared channel resources.

Another apparatus for wireless communication at a base station is described. The apparatus may include means for receiving, from a UE, a first random access message of a random access procedure, the first random access message including a random access preamble, determining a format of a second random access message based on the first random access message, the second random access message including an indication of a first set of physical uplink shared channel resources associated with the random access preamble and a second set of physical uplink shared channel resources associated with the random access preamble, transmitting the second random access message based on the indication, and receiving, based on the second random access message, a third random access message from the UE, the third random access message multiplexed with a fourth random access message from a second UE on resources of the first set of physical uplink shared channel resources or resources of the second set of physical uplink shared channel resources.

A non-transitory computer-readable medium storing code for wireless communication at a base station is described. The code may include instructions executable by a processor to receive, from a UE, a first random access message of a random access procedure, the first random access message including a random access preamble, determine a format of a second random access message based on the first random access message, the second random access message including an indication of a first set of physical uplink shared channel resources associated with the random access preamble and a second set of physical uplink shared channel resources associated with the random access preamble, transmit the second random access message based on the indication, and receive, based on the second random access message, a third random access message from the UE, the third random access message multiplexed with a fourth random access message from a second UE on resources of the first set of physical uplink shared channel resources or resources of the second set of physical uplink shared channel resources.

In some examples of the method, apparatuses, and non-transitory computer-readable medium described herein, the third random access message may be multiplexed with the fourth random access message from the second UE based on a space-division multiple access procedure.

In some examples of the method, apparatuses, and non-transitory computer-readable medium described herein, receiving the third random access message may include operations, features, means, or instructions for receiving signaling over a first set of demodulation reference signal ports different from a second set of demodulation reference signal ports associated with the fourth random access message from the second UE.

Some examples of the method, apparatuses, and non-transitory computer-readable medium described herein may further include operations, features, means, or instructions for receiving, from the second UE, a first random access message of a second random access procedure, the first random access message including a second random access preamble, where the first set of physical uplink shared channel resources and the second set of physical uplink shared channel resources may be associated with the second random access preamble.

In some examples of the method, apparatuses, and non-transitory computer-readable medium described herein, the second random access message indicates the first set of physical uplink shared channel resources, and the second set of physical uplink shared channel resources relative to the first set of physical uplink shared channel resources.

In some examples of the method, apparatuses, and non-transitory computer-readable medium described herein, the second random access message indicates a first index value corresponding to the first set of physical uplink shared channel resources and a second index value corresponding to the second set of physical uplink shared channel resources.

A method of wireless communication at a base station is described. The method may include determining a resource configuration for a set of shared physical uplink shared channel resources associated with one or more random access procedures, transmitting, to a first UE and a second UE based on the determining, the resource configuration for the set of shared physical uplink shared channel resources, and receiving, a first random access message of a first random access procedure from the first UE at a first subset of the set of shared physical uplink shared channel resources and a second random access message of a second random access procedure from the second UE at a second subset of the set of physical uplink shared channel resources that is separate from the first subset.

An apparatus for wireless communication at a base station is described. The apparatus may include a processor, memory in electronic communication with the processor, and instructions stored in the memory. The instructions may be executable by the processor to cause the apparatus to determine a resource configuration for a set of shared physical uplink shared channel resources associated with one or more random access procedures, transmit, to a first UE and a second UE based on the determining, the resource configuration for the set of shared physical uplink shared channel resources, and receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset.

Another apparatus for wireless communication at a base station is described. The apparatus may include means for determining a resource configuration for a set of shared physical uplink shared channel resources associated with one or more random access procedures, transmitting, to a first UE and a second UE based on the determining, the resource configuration for the set of shared physical uplink shared channel resources, and receiving, a first random access message of a first random access procedure from the first UE at a first subset of the set of shared physical uplink shared channel resources and a second random access message of a second random access procedure from the second UE at a second subset of the set of physical uplink shared channel resources that is separate from the first subset.

A non-transitory computer-readable medium storing code for wireless communication at a base station is described. The code may include instructions executable by a processor to determine a resource configuration for a set of shared physical uplink shared channel resources associated with one or more random access procedures, transmit, to a first UE and a second UE based on the determining, the resource configuration for the set of shared physical uplink shared channel resources, and receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset.

Some examples of the method, apparatuses, and non-transitory computer-readable medium described herein may further include operations, features, means, or instructions for identifying the first subset of the set of shared physical uplink shared channel resources based on a first random access preamble included in the first random access message, and identifying the second subset of the set of shared physical uplink shared channel resources based on a second random access preamble included in the second random access message.

In some examples of the method, apparatuses, and non-transitory computer-readable medium described herein, identifying the set of physical uplink shared channel resources further may include operations, features, means, or instructions for identifying the first subset at a beginning of the set of physical uplink shared channel resources and the second subset at an end of the set of physical uplink shared channel resources.

In some examples of the method, apparatuses, and non-transitory computer-readable medium described herein, identifying the set of physical uplink shared channel resources further may include operations, features, means, or instructions for determining the first random access message may be associated with a transmit priority above a threshold, where the first subset includes resources of the set of shared physical uplink shared channel resources that precede the second subset.

In some examples of the method, apparatuses, and non-transitory computer-readable medium described herein, identifying the set of resources further may include operations, features, means, or instructions for determining the second random access message may be associated with a transmit priority above a threshold, where the second subset includes resources of the set of shared physical uplink shared channel resources that precede the first subset.

Some examples of the method, apparatuses, and non-transitory computer-readable medium described herein may further include operations, features, means, or instructions for transmitting a third random access message to the first UE and a fourth random access message to the second UE, the third random access message and the fourth random access message including information for establishing a connection between the respective UE and the base station.

In some examples of the method, apparatuses, and non-transitory computer-readable medium described herein, the identifying further may include operations, features, means, or instructions for identifying a first subset of a second set of shared physical uplink shared channel resources based on a first random access preamble included in the first random access message, and identifying a second subset of the second set of shared physical uplink shared channel resources based on a second random access preamble included in the second random access message.

In some examples of the method, apparatuses, and non-transitory computer-readable medium described herein, the first subset includes resources of the second set of physical uplink shared channel resources that precede the second subset.

In some examples of the method, apparatuses, and non-transitory computer-readable medium described herein, the second subset includes resources of the second set of physical uplink shared channel resources that precede the first subset.

In some examples of the method, apparatuses, and non-transitory computer-readable medium described herein, the random access procedure and the second random access procedure may be two-step random access procedures.

DETAILED DESCRIPTION

Figure 1:
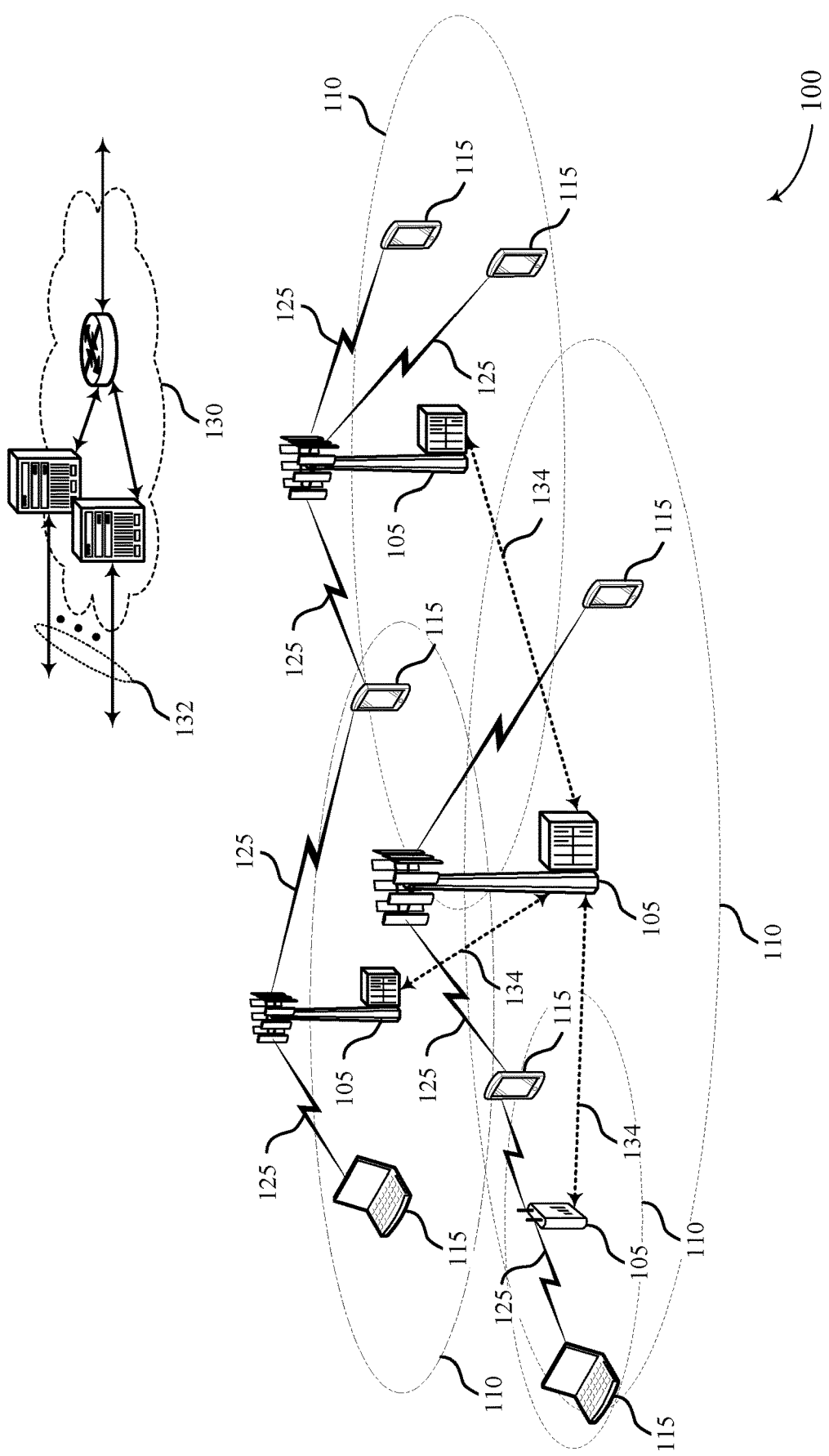
FIG. 1 illustrates an example of a wireless communications system that supports techniques related to random access channel (RACH) operation in accordance with aspects of the present disclosure.

In some wireless communications systems, devices such as a user equipment (UE) and base station may support one or more random access procedures for communication, including an initial access to a channel, a connection re-establishment, a handover procedure, or synchronization on the channel. As demand for communication access increases, the wireless communications system may target low latencies or seek resource reliability for random access signaling, particularly for high priority communications. In some examples, however, some physical layer procedures may fail to provide signaling capacity and robustness for enhanced random access channel (RACH) operations, including support for increased data rates and spectral efficiency across transmission.

As described herein, a device (e.g., a UE, a base station) may support physical layer procedures for enhanced signaling capability in random access. In some examples, a UE may promote low latency communications and determine one or more signaling characteristics associated with a two-step random access procedure. For example, the UE may determine a transmit priority for a first random access message (e.g., message A (msgA)) based on one or more of a duration of the random access message or a priority associated with an included data payload. In other examples, the UE may indicate a timing configuration for receiving a second random access message (e.g., a message B (msgB)) in response. The timing configuration may, in some examples, be based on a priority associated with the RACH operation. In other examples, the UE may determine a resource configuration for the two-step random access procedure. The resource configuration may include a time-varying mapping of a random access preamble or uplink shared channel resources associated with a random access message. Additionally or alternatively, the base station may determine a resource configuration for the two-step random access procedure. The resource configuration may include a dynamic allocation of uplink shared channel resources for mapping multiple random access preambles.

In other examples, the UE may perform low priority communications associated with a four-step random access procedure, or support fallback from a two-step random access procedure to a four-step random access procedure, or both. The UE or the base station may promote enhanced antenna techniques associated with the four-step random access procedure. For example, the base station may support formatting of a random access response message (e.g., message 2 (msg2)) for indicating spatial division multiple access (SDMA) based random access message (e.g., message 3 (msg3)) transmission by multiple UEs. The multiple random access messages may be signaled by one or more UEs via different demodulation reference signal (DMRS) ports, and carried over shared channel resources that may be assigned to one or more random access preambles.

Particular aspects of the subject matter described in this disclosure may be implemented to realize one or more of the following potential advantages. The described signaling characteristics associated with a two-step random access procedure may support improved data rates and enhanced signaling reliability for random access, among other advantages. Supported resource configurations for two-step random access procedure may include features for increased data capacity or spectral efficiency within random access messages. The described antenna techniques associated with the four-step random access procedure may increase frequency diversity for random access message transmission or improve spectral efficiency and range, among other advantages.

Aspects of the disclosure are initially described in the context of a wireless communications system. Aspects of the disclosure are further described in the context one or more additional wireless communications systems and one or more mapping schemes that relate to aspects for random access. Aspects of the disclosure are further illustrated by and described with reference to apparatus diagrams, system diagrams, and flowcharts that relate to several aspects related to two-step RACH.

FIG. 1 illustrates an example of a wireless communications system 100 that supports techniques related to RACH operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105). The UEs 115 may include at least one of an antenna, a display, or a user interface.

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize licensed radio frequency spectrum bands, unlicensed radio frequency spectrum bands, or both. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may perform a connection procedure (such as a radio resource control procedure, a cell acquisition procedure, a random access procedure, a radio resource control connection procedure, a radio resource control configuration procedure) with a UE 115. For example, a base station 105 and a UE 115 may perform a random access procedure to establish a connection. In some other implementations, a base station 105 and a UE 115 may perform a random access procedure to re-establish a connection after connection failure (such as radio-link failure) with the base station 105, or to establish a connection for handover to another base station, or the like. As part of the random access procedure, a UE 115 may transmit a random access message (e.g., message 1 (msg1)) carrying a random access preamble. The random access preamble may enable the base station 105 to distinguish between multiple UEs 115 attempting to access the wireless communications system 100 simultaneously.

The base station 105 may respond with a random access response (e.g., message 2 (msg2) that provides an uplink resource grant, a timing advance, and a temporary cell network temporary identifier (C-RNTI). The UE 115 may transmit a subsequent random access message (e.g., message 3 (msg3)) that includes an RRC connection request along with a TMSI (if the UE 115 has previously been connected to the same wireless network) or a random identifier. The RRC connection request also may indicate the reason the UE 115 is connecting to the network (emergency, signaling, data exchange, etc.). The base station 105 may respond to the connection request with a contention resolution message (e.g., message 4 (msg4)) addressed to the UE 115, which may provide a new C-RNTI. If the UE 115 receives a contention resolution message with the correct identification, the UE 115 may proceed with RRC connection setup. If the UE 115 does not, however, receive a contention resolution message (if there is a conflict with another UE 115) the UE 115 may repeat the random access process by transmitting a new random access preamble. As described, the exchange of messages between the UE 115 and base station 105 for random access may be referred to as a four-step random access procedure.

In other examples, a two-step random access procedure may be performed for random access. UEs 115 that operate in licensed or unlicensed spectrum within the wireless communications system 100 may participate in a two-step random access procedure to reduce delay in establishing communication with a base station 105 (such as compared to a four-step random access procedure). In some examples, the two-step random access procedure may operate regardless of whether a UE 115 has a valid timing advance parameter. For example, a UE 115 may use a valid timing advance parameter to coordinate the timing of its transmissions to a base station 105 (to account for propagation delay) and may receive the valid timing advance parameter as part of the two-step random access procedure. Additionally, the two-step random access procedure may be applicable to any cell size, may work regardless of whether the random access procedure is contention-based or contention-free, and may combine multiple random access messages from a four-step random access procedure.

For example, the UE 115 may transmit a first random access message (e.g., message A (msgA)) to the base station 105, the random access message may include the contents of a msg1 and msg3 from four-step random access procedure. Additionally, msgA may consist of a random access preamble and a physical uplink shared channel (PUSCH) carrying a payload with the contents of the message (equivalent to msg3), where the preamble and the payload may be transmitted on separate waveforms. In some examples, the base station 105 may transmit a downlink control channel (such as PDCCH) and a corresponding second random access message (e.g., message B (msgB)) to the UE 115, where msgB may combine the equivalent contents of a msg2 and msg4 from four-step random access procedure. In some examples of two-step random access procedure, a base station 105 may transmit msgB using either broadcast methods (for example, targeting multiple UEs 115) or unicast methods (for example, targeting a specific UE 115).

In some examples, a two-step random access procedure may include support for fall back communications to a four-step random access procedure. Fallback communication may benefit random access procedure when signal attenuation or delays in signaling impede connection establishment between a base station 105 and a UE 115. For example, a UE 115 may transmit a first random access message (e.g., message A (msgA)) to a base station 105 as part of a two-step random access procedure. The base station 105 may receive and detect the preamble included in the msgA, but fail to decode the included PUSCH payload. In some other implementations, the random access procedure may be contention-based. The UE 115 may transmit the preamble associated with the msgA, but may experience intermittence in transmitting the PUSCH payload based on data traffic on the channel. The base station 105 may receive and detect the preamble without receiving the PUSCH payload associated with the random access procedure. It may be advantageous for the base station 105 to utilize the received preamble for continued handshake message exchange associated with a fall back to four-step random access procedure, rather than performing retransmission of the msgA associated with the two-step random access procedure. Specifically, by utilizing the received preamble, the base station 105 may reduce signaling overhead.

As described herein, in some examples, the UE 115 and the base station 105 may support one or more physical layer procedures that support enhanced signaling capacity for RACH operations. In some examples, the one or more physical layer procedures may be associated with a two-step random access procedure, and include signaling characteristics for msgA and msgB transmission that are based on a random access priority. For example, the UE 115 may determine a transmit priority for msgA transmission within an allocated transmit power configuration for simultaneous transmission associated with multiple channels. In other examples, the UE 115 may indicate a timing configuration for receiving a msgB response within a prioritized receiving window. In other examples, the UE 115 may determine a resource configuration that includes a time-varying mapping of a random access preamble or PUSCH resources associated with the msgA transmission. Additionally or alternatively, the base station 105 may determine a dynamic allocation of shared PUSCH resources that include suballocations mapped to multiple random access preambles. In other examples, the one or more physical layer procedures may be associated with a four-step random access procedure, and promote enhanced antenna techniques for msg3 transmission. For example, the base station 105 may support formatting of a random access response message (e.g., message 2 (msg2)) for indicating subsequent spatial division multiple access (SDMA) based transmission by the UE 115. The indication may include opportunities for msg3 transmission by multiple UEs 115 on a single time-frequency allocation via different demodulation reference signal (DMRS) ports.

The physical layer procedures associated with both two-step random access procedure and four-step random access procedure may promote one or more of: increased data rates, improved data capacity, enhanced spectral efficiency, or targeted low latencies. For example, the described signaling characteristics associated with a two-step random access procedure may support improved data rates and enhanced signaling reliability for random access. Supported resource configurations for two-step random access procedure may include features for increased data capacity or spectral efficiency within random access messages. In other examples, the described antenna techniques associated with the four-step random access procedure may increase frequency diversity for random access message transmission or improve spectral efficiency and range.

Figure 2:
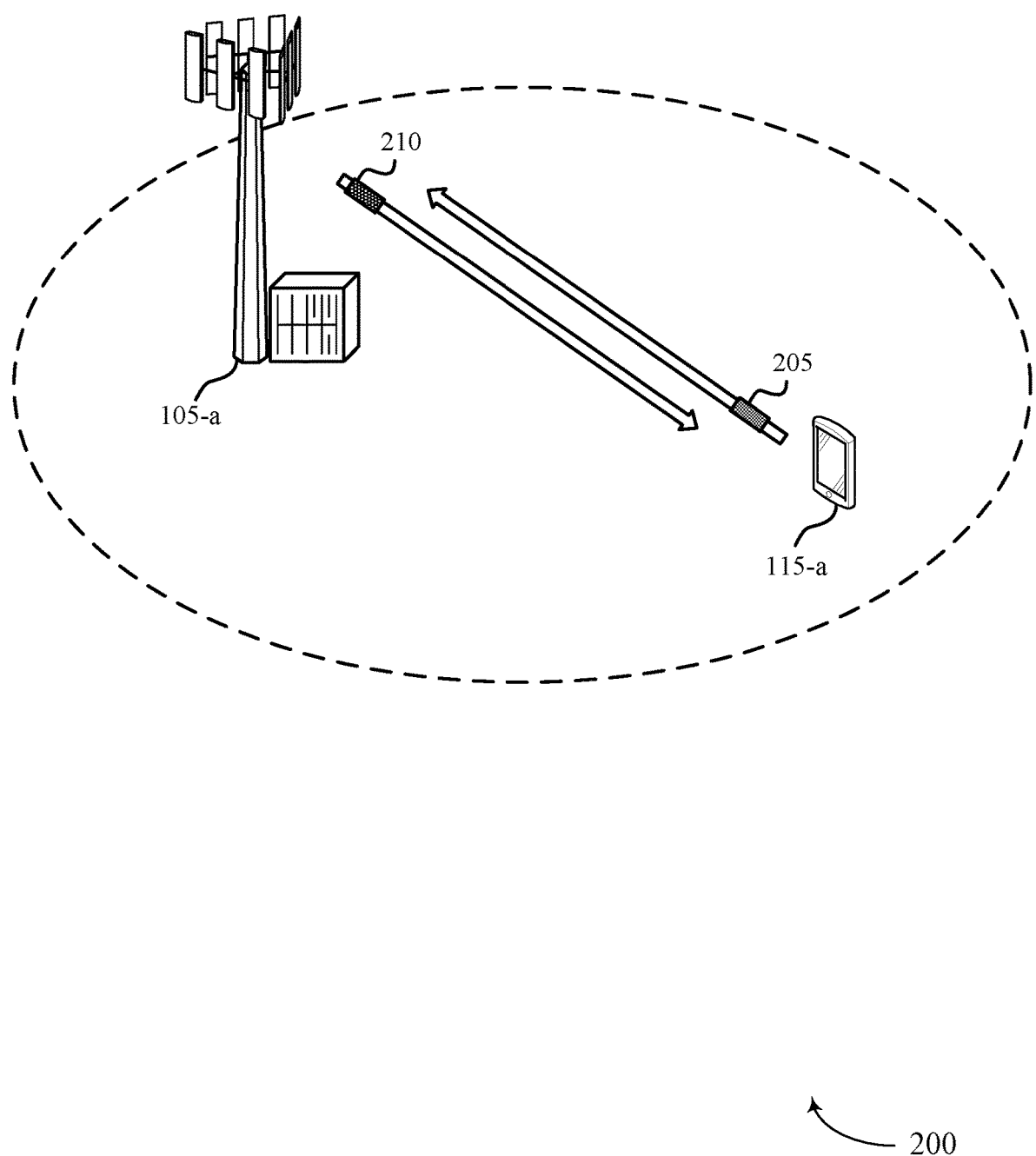
FIG. 2 illustrates an example of a wireless communications system that supports techniques related to RACH operation in accordance with aspects of the present disclosure.

FIG. 2 illustrates an example of a wireless communications system 200 that supports techniques related to RACH operation in accordance with aspects of the present disclosure. The wireless communications system 200 may include a base station 105-*a* and a UE 115-*a*, which may be examples of the corresponding devices described with reference to FIG. 1. For example, the base station 105-*a* and the UE 115-*a* may perform connectivity establishment via a random access procedure.

In some examples, wireless communications system 200 may support multiple radio access technologies including 4G systems such as LTE systems, LTE-A systems, or LTE-A Pro systems, and 5G systems which may be referred to as NR systems. The connection procedure (such as random access procedure) between the base station 105-*a* and the UE 115-*a* may correspond to, for example, at least one of the above example radio access technologies. For example, base station 105-*a* and UE 115-*a* may perform a random access procedure to establish a connection for wired or wireless communication. In some implementations, base station 105-*a* and UE 115-*a* may perform a random access procedure to re-establish a connection after connection failure (such as a radio-link failure) with the base station 105-*a*, or to establish a connection for handover to another base station 105, or the like.

As shown in FIG. 2, wireless communications system 200 may be related to 5G systems and the connectivity establishment may correspond to a two-step random access procedure. The two-step random access procedure may be based on a transmit priority and target low latencies for connectivity establishment. As part of a two-step random access procedure, the base station 105-*a* and the UE 115-*a* may exchange fewer messages (e.g., fewer handshake messages) compared to a four-step random access procedure. For example, the UE 115-*a* may transmit a single random access message 225 (also referred to herein as a message A (msgA)) that may include a random access preamble or a PUSCH carrying a payload. In response to the random access message 225, the base station 105-b may transmit a single random access response message 230 (also referred to herein as a message B (msgB)) on a downlink channel.

The UE 115-a may initiate the random access procedure, which may include identifying a RACH occasion and transmitting the random access message 205 (e.g., msgA). The random access message 205 may combine part of other messages (e.g., msgs1,3) associated with four-step random access procedure. For example, the random access message 205 may include a random access preamble (also referred to as a RACH preamble, or a physical random access channel (PRACH) preamble, or a preamble sequence) that may carry information, such as a UE identifier. In addition, the random access message 205 may include uplink shared channel (UL-SCH) resources (or PUSCH resources) assigned to carry a connection request, user-plane data, channel state information (CSI), or uplink control information (UCI) directed to the base station 105-a. In some examples, the resources (e.g., UL-SCH or PUSCH resources) may include a unique identifier within the cell (such as a C-RNTI) or an identifier specific to the UE 115-a.

Per cell, there may be a number of preamble sequences (such as 64 preamble sequences) that may be partitioned onto resources (e.g., subcarriers) associated with the RACH occasion. In some examples, the UE 115-a may select a preamble sequence from a set of sequences in a cell (for example, geographic coverage area of base station 105-a) based in part on a random selection. In other examples, the UE 115-a may select a preamble sequence from a set of sequences, which may be based on the type of random access procedure, among other factors. For example, the UE 115-a may select a preamble sequence that is associated with a two-step random access procedure. Additionally or alternatively, one or more alternative preamble sequences may be associated with four-step random access procedure or fallback mechanisms from two-step random access procedure to four-step random access procedure. In other examples, the UE 115-a may select a preamble sequence based in part on an amount of traffic that the UE 115-a has for transmission on an UL-SCH channel. From the preamble sequence that the UE 115-a selected, the base station 105-a may determine the amount of uplink resources to be granted to the UE 115-a.

Some implementations of a random access procedure may either be contention-based or contention-free. When performing a contention-based random access procedure, the UE 115-a may select a preamble sequence from a set of sequences. That is, as long as other UEs 115 (not shown) are not performing a random access attempt using the same sequence at a same time, no collisions will occur, and the random access attempt may be detected by the base station 105-a. If the UE 115-a is performing a contention-free random access attempt, for example, for a handover to a new cell, the preamble sequence to use may be explicitly signaled (e.g., in control information) by the base station 105-a. To avoid collisions or interference, the base station 105-a may select a contention-free preamble sequence from sequences not associated with the contention-based random access attempt.

Based on the selection, the preamble sequence may map to resources (e.g., the UL-SCH resources or PUSCH resources) directed to the base station 105-a. The resources may, in some examples, span multiple symbol periods and include multiple subcarrier frequencies associated with the downlink channel. The UE 115-a may be configured for signaling over the resources using one or more DMRS ports, and the PUSCH resources may include (e.g., be formatted to include) a frequency offset relative to the resources of the RACH occasion. In some examples, the mapping between the preamble sequence and the PUSCH resources may correspond to a many-2-one mapping, where multiple preamble sequences from the set of sequences may map to a respective set of PUSCH resources. The many-2-one mapping may improve statistical multiplexing for spectral efficiency, among other benefits. In other examples, the mapping between the preamble sequence and the PUSCH resources may correspond to a one-2-many mapping, where the selected preamble sequence may map to multiple sets of PUSCH resources. The one-2-many mapping may improve signaling reliability based on resource diversity, particularly via (LBT) diversity for contention-based random access, among other advantages.

Upon receiving the random access message 205, the base station 105-a may respond appropriately with a random access message 210 (e.g., msgB). For example, the base station 105-a may transmit the random access message 210 to the UE 115-a on a downlink shared channel (DL-SCH) or a physical downlink control channel (PDCCH). The random access message 205 may combine part of messages (e.g., msgs2,4) associated with four-step random access procedure. For example, the random access message 210 may include an index of a preamble sequence detected and for which the response is valid, a timing advance parameter determined based in part on the preamble sequence detected, a network identifier (such as an RA-RNTI) for further communication with the UE 115-a, or a contention resolution message.

In some examples, the UE 115-a may monitor the downlink channel for receiving the random access message 210 during a configured random access response window. Upon reception of the random access message 210, the UE 115-a may compare an identifier (such as a network identifier) in the random access message 210 to an identifier specified in the random access message 205. When the identifiers match, the UE 115-a may determine that the random access procedure was successful. UEs that do not identify a match between the identifiers may be considered to fail the random access procedure and may repeat the random access procedure (e.g., with the base station 105-a). As a result of the connection procedure, the base station 105-a and the UE 115-a may perform one or more procedures, such as establishing a connection for wired or wireless communication within the wireless communications system 200.

Although some connection procedures may be effective for facilitating random access for the UE 115-a, there may be some limitations in physical layer procedures related to the random access procedure. For example, the described procedure may provide insufficient signaling capacity and robustness for enhanced random access, including support for increased data rates and spectral efficiency across channel resources. Additionally, the described procedure may include default assumptions corresponding to a static resource mapping associated with the transmissions of random access messages 205 and 210. The techniques described herein may provide advantages for the UE 115-a and the base station 105-a by relating to enhanced physical layer procedures that support enhanced signaling characteristics for two-step random access procedure.

In some examples, some aspects associated with signaling characteristics at the UE 115-a for transmitting the random access message 205 may be less than ideal. For example, the wireless communications system 200 may support simultaneous transmission by the UE 115-*a* on multiple channels. In some examples, the UE 115-*a* may be configured for performing PRACH transmission for establishing communication with a base station 105 (such as base station 105-*a*) in a cell. Simultaneously, the UE 115-*a* may be configured for performing sounding reference signal (SRS), physical uplink control channel (PUCCH), PUSCH, or additional transmission directed to one or more additional base stations 105.

To improve signaling reliability for high priority communications, the UE 115-*a* may be configured with a transmit power allocation. The transmit power allocation may include multiple transmit power levels for message signaling that are based on a transmit priority associated with the message transmission. In some examples, the transmit power may be listed (e.g., in descending order) based on the message type, as follows: PRACH transmission on a primary serving cell of wireless communications system 200, PUCCH transmissions that include HARQ feedback or scheduling request (SR) or PUSCH transmission with HARQ feedback information, PUCCH transmission with CSI or PUSCH transmission with CSI, PUSCH transmission that does not include HARQ feedback information or CSI, and SRS transmission or PRACH transmission on a secondary serving cell of the wireless communications system 200. In some examples, the transmit power allocation may be further refined to include aperiodic SRS transmission as having a higher transmit priority than semi-persistent or periodic SRS transmission.

In some examples, however, the configured transmit power allocation may not include support for transmissions associated with two-step random access procedure (such as random access message 205). Without a configured transmit priority, components of the random access message 205 may face signal attenuation and interference that may hinder signaling reliability. In addition, the limitations of the transmit power allocation may impose delays in achieving target low latencies corresponding to a random access priority. The described techniques may include a formatting of the configured transmit power allocation to include a transmit priority configuration for two-step RACH signaling (such as random access message 205). Based on the formatting, UE 115-*a* may experience improved data rates and enhanced signaling reliability for two-step random access procedure.

In some examples, the UE 115-*a* may determine a transmit priority for the random access message 205 based on a transmit duration of the random access message 205. For example, the UE 115-*a* may evaluate whether the included contents of the random access message 205 spans a set of OFDM symbols on a channel that is less than a configured threshold value (duration). In some examples, when the message contents (e.g., preamble sequence, PUSCH resources) may span a set of OFDM symbols that is less than the threshold value, the UE 115-*a* may assign a first transmit priority (e.g., highest transmit priority) for the random access message 205. In other examples, random access message 205 may include a gap period between the preamble sequence and PUSCH resources carrying a connection request. Similarly, when the message contents (e.g., preamble sequence, gap period, PUSCH resources) are less than the threshold value, the UE 115-*a* may assign a first transmit priority (e.g., highest transmit priority) for the random access message 205. The highest transmit priority may correspond to a highest transmit power included in the transmit power allocation. In some examples, the highest transmit priority may correspond to the transmit power associated with PRACH transmission on a primary serving cell.

In other examples, the UE 115-*a* may determine a transmit priority for the random access message 205 based on signal characteristics of the message. The UE 115-*a* may determine whether the information included in random access message 205 exceeds a configured priority threshold. For example, the UE 115-*a* may determine one or more of: whether the preamble sequence included in random access message 205 is part of a set of preamble sequences associated with a high transmit priority, whether the transmission is associated with resources of a high priority RACH occasion, or additional signaling indication included in the random access message 205. When the message contents exceed the configured priority threshold, the UE 115-*a* may assign a highest transmit priority for the random access message 205. The highest transmit priority may correspond to a highest transmit power included in the transmit power allocation. In some examples, the highest transmit priority may correspond to the transmit power associated with PRACH transmission on a primary serving cell.

Additionally or alternatively, the UE 115-*a* may evaluate the included contents of the random access message 205 separately. For example, the UE 115-*a* may determine (e.g., statically determine) that the preamble sequence has a highest transmit priority associated with the transmit power allocation. In addition, the UE 115-*a* may determine a transmit priority associated with the mapped PUSCH resources based on an included data payload. In some examples, the UE 115-*a* may identify SR signaling, or HARQ feedback information, or both in the included data payload. The UE 115-*a* may then communicate a transmit priority for the PUSCH resources that corresponds to the transmit power for PUCCH transmissions that include HARQ feedback or scheduling request (SR) or PUSCH transmission with HARQ feedback information, as described herein. In other examples, the UE 115-*a* may identify CSI carried by the included data payload. The UE 115-*a* may then communicate a transmit priority for the PUSCH resources that corresponds to the transmit power for PUCCH transmission with CSI or PUSCH transmission with CSI, as described herein.

As described, the one or more techniques for determining a transmit priority for random access message 205 may promote improved data rates and enhanced signaling reliability for two-step random access procedure, among other advantages. In particular, the UE 115-*a* may transmit the random access message 205 to base station 105-*a* based on an enhanced transmit power allocation for multi-channel transmission. Based on the configured transmit priority for transmission, the UE 115-*a* may improve signaling reliability and data rates for high priority random access procedure. Increased signaling reliability may promote higher processing and decoding success at the base station 105-*a*, and lead to random access response message (such as random access message 210) transmission that satisfies low latency targets.

In other examples, the described limitations may be associated with latency in random access response reception for two-step random access procedure. For example, the UE 115-*a* may be configured to evaluate downlink channel resources (for random access message 210) following a statically configured timing offset. The timing offset may correspond to a fixed number of OFDM symbols after transmitting a last PUSCH symbol associated with the random access message 205 and may be different than a timing offset for another random access procedure, such as a four-step random access procedure.

Diverse payloads may be supported by a two-step random access procedure and, in some examples, low latency communications may be of particular emphasis for high priority connection establishment. In some examples, a fixed timing offset may impose delays in achieving target low latencies corresponding to a random access priority. The described techniques may include support for prioritized response receiving windows that may be based on a dynamic timing configuration.

The base station 105-a may transmit broadcast or multicast information to the UE 115-a indicating a capability for high priority or low priority transmission. For example, the base station 105-a may transmit a remaining minimum system information (RMSI) indication via downlink shared channel resources. In some examples, the RMSI indication may include a configured response window for high priority transmission or a configured response window for low priority transmission. The UE 115-a may receive the RMSI indication and determine a transmit priority capability at the base station 105-a.

The UE 115-a may initiate the random access procedure by identifying a RACH occasion for potential random access message transmission. As described, there may be a number of preamble sequences that may be partitioned onto resources (e.g., subcarriers) associated with the RACH occasion. In some examples, the number of preamble sequences may be partitioned based on a random access procedure type. For example, the RACH occasion may include a set of preamble sequences associated with two-step random access procedure. In other examples, the RACH occasion may include one or more additional preamble sequences associated with four-step random access procedure or fallback mechanisms from two-step random access procedure to four-step random access procedure.

Based on the supported transmit priority capability at base station 105-a, the UE 115-a may select a preamble sequence. In addition, the UE 115-a may identify uplink PUSCH resources associated with the selected preamble sequence. To improve prioritized response timing the UE 115-a may indicate, as part of a random access message 205, a timing configuration for receiving random access message the 210 during a response window. In some examples, the timing configuration may correspond to the configured response window for high priority transmission or the configured response window for low priority transmission at the base station 105-a.

For example, the UE 115-a may indicate a timing configuration of the response window through the selected preamble sequence or RACH occasion associated with transmission of the random access message 205. In some examples, the timing configuration may be based on a transmit priority associated with the two-step random access procedure. For example, the UE 115-a may indicate a response window (e.g., a condensed response window) when the two-step random access procedure is of high priority (e.g., has a priority above a priority threshold). Additionally or alternatively, the UE 115-a may indicate a condensed response window based on one or more operating contexts, such as low battery instances. The UE 115-a may indicate multiple transmit beams associated with one or more DMRS ports to increase scheduling flexibility at the base station 105-a.

In other examples, the UE 115-a may indicate a timing configuration of the response window through a payload of the set of PUSCH resources included in random access message 205. In some examples, the UE 115-a may indicate a condensed response window based on one or more operating contexts. For example, the UE 115-a may indicate the timing configuration through the payload when base station 105-a does not support fallback from two-step random access procedure to four-step random access procedure.

As described, the one or more techniques for determining a prioritized window for monitoring downlink channel resources at the UE 115-a may promote improved data rates and reduce RTT for two-step random access procedure. In particular, the base station 105-a may send (e.g., broadcast) a capability indication for high or low priority transmission. Based on the indication, the UE 115-a may dynamically indicate a specific timing configuration for a response window as part of random access message 205. The base station 105-b may then transmit random access message 210 within the prioritized response receiving window monitored by the UE 115-a. The prioritized response window may enhance signaling throughput and promote communication establishment between the UE 115-a and the base station 105-a within low latency targets, among other advantages.

In other examples, the described limitations may be associated with a mapping between a selected preamble sequence and PUSCH resources for transmitting the random access message 205.

Figure 3:
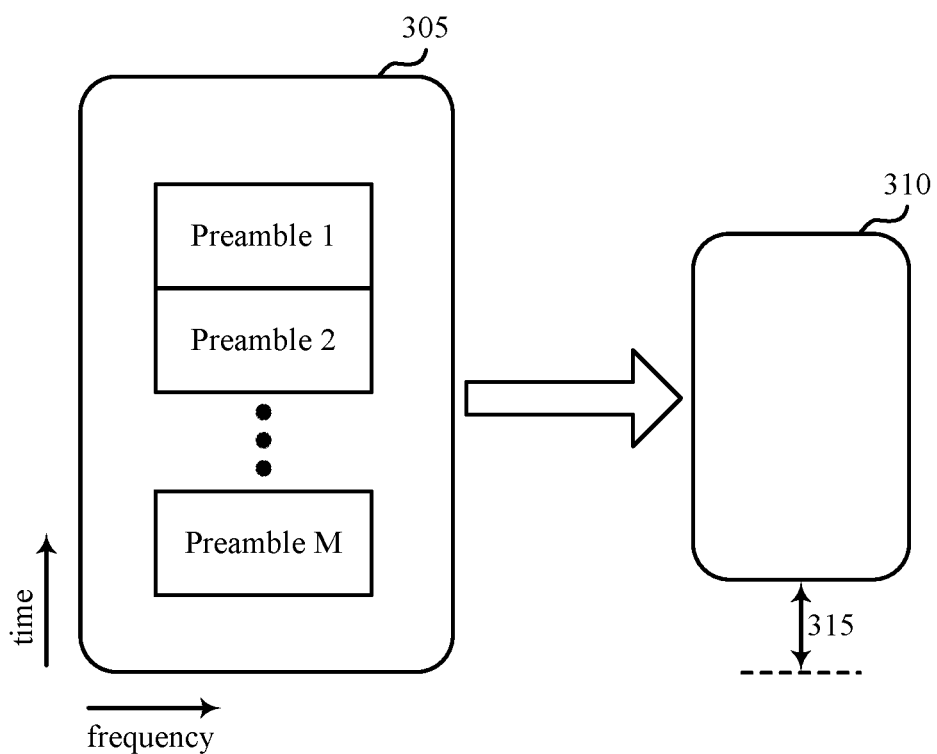
FIG. 3 illustrates an example of a mapping scheme that supports techniques related to RACH operation in accordance with aspects of the present disclosure.

FIG. 3, for example, illustrates an example of a mapping scheme 300 that supports techniques related to RACH operation in accordance with aspects of the present disclosure. In some examples, mapping scheme 300 may implement aspects of wireless communications systems 100 and 200, as described with reference to FIGS. 1 and 2. For example, the mapping scheme 300 may be based on RACH occasion configuration by a base station 105, and implemented by a UE 115 for transmitting a first random access message, as described with reference to FIGS. 1 and 2.

As shown in FIG. 3, for an associated coverage cell of a wireless communications system, a RACH occasion 305 may include time and frequency resources for initiating a random access procedure. A number of preamble sequences (e.g., Preamble 1, Preamble 2, Preamble M) may be partitioned onto resources associated with the RACH occasion 305. As described, in some examples, the number of preamble sequences may be partitioned on the resources associated with the RACH occasion 305 based on a random access procedure type.

A UE 115 may initiate the random access procedure by identifying the RACH occasion 305 and selecting a preamble sequence based on a transmit priority associated with the random access procedure. Based on the selection, the preamble sequence may map to a resource allocation within a set of PUSCH resources 310. The UE 115 may be configured for signaling over the PUSCH resources 310 using one or more DMRS ports, and the PUSCH resources 310 may be formatted to include a frequency offset 315 relative to the resources of the RACH occasion 305. In some examples, the mapping between a preamble sequence (e.g., Preamble 1) and the PUSCH resources 310 may correspond to a many-2-one mapping, as one example, where multiple preamble sequences from the set of sequences may map to the set of PUSCH resources 310. Additionally or alternatively, the mapping between a preamble sequence and the PUSCH resources may correspond to a one-2-many mapping, where the selected preamble sequence may map to multiple sets of PUSCH resources including the set of PUSCH resources 310.

To reduce broadcast signaling for random access, in some examples, the UE 115 and a base station 105 may assume a static mapping between a selected preamble sequence (e.g., Preamble 1) and the set of PUSCH resources 310. That is, the UE 115 and the base station 105 may determine that a selected preamble sequence (e.g., Preamble 1) maps to the set of PUSCH resources 310 at any time instance and is signaled over a configured set of DMRS ports. In some examples, the static mapping may include a fixed frequency offset 315 for the set of PUSCH resources 310 relative to resources associated with the RACH occasion 305, where the selected preamble sequence and the PUSCH resources 310 may include distinct frequency resources. In some examples, the PUSCH resources 310 and the preamble sequence may not overlap in time when the PUSCH resources 310 may be related to (e.g., may be mapped from) the preamble sequence. A static mapping, however, may provide insufficient diversity for signaling a first random access message, particularly within a small set of preamble sequences or a condensed PUSCH resource set for two-step random access. As a result, the UE 115 may experience reduced data rates and lower signaling reliability due to insufficient signaling diversity for two-step random access.

The described techniques may include support for frequency diversity in resource selection for two-step random access procedure. The frequency diversity may, for example, be based on a time-varying mapping that includes dynamic frequency allocation (hopping) associated with the RACH occasion 305 or the set of PUSCH resources 310 over a temporal duration. Based on the time-varying mapping, the UE 115 may experience increased frequency diversity for random access message (e.g., msgA) transmission.

In some examples, a UE 115 and a base station 105 may implement a time-varying mapping that includes a dynamic frequency allocation (e.g., hopping) for frequency resources associated with the RACH occasion 305 and PUSCH resources (such as the set of PUSCH resources 310). For example, at a first time instance, the RACH occasion 305 may be associated with a first set of frequency resources within a frequency spectrum bandwidth. At a second time instance, the RACH occasion 305 may be associated with a second set of frequency resources within the frequency spectrum bandwidth that is different than the first. Similarly, at a first time instance, the set of PUSCH resources 310 may be associated with a first set of frequency resources and, at a second time, with a second set of frequency resources that is different than the first. In some examples, the change in frequency resources associated with the PUSCH resources 310 may be relative to the change in frequency resources for the random access occasion 305.

In other examples, a UE 115 and a base station 105 may implement a time-varying mapping that may include a dynamic frequency offset for the resource mapping. For example, a wireless communications system may be configured with a set of resources. The RACH occasion 305 may configured with a static frequency location within a frequency spectrum bandwidth. At a first time instance, the frequency offset 315 may span a first frequency value for mapping the set of PUSCH resources 310. At a second time instance, the frequency offset 315 may span a second frequency value that is different from the first frequency value. At each of the time instances, the PUSCH resources 310 may map to one or more preamble sequences included in the random access occasion 305.

Additionally or alternatively, the described techniques may include support for frequency diversity based on a time-varying mapping that may include a dynamic mapping between preamble sequences and PUSCH resources over a temporal duration. The dynamic mapping may include a change of configured DMRS ports for random access message transmission (e.g., msgA) over the duration. Based on the time-varying mapping, the UE 115 may experience increased frequency diversity for random access.

Figure 4A:
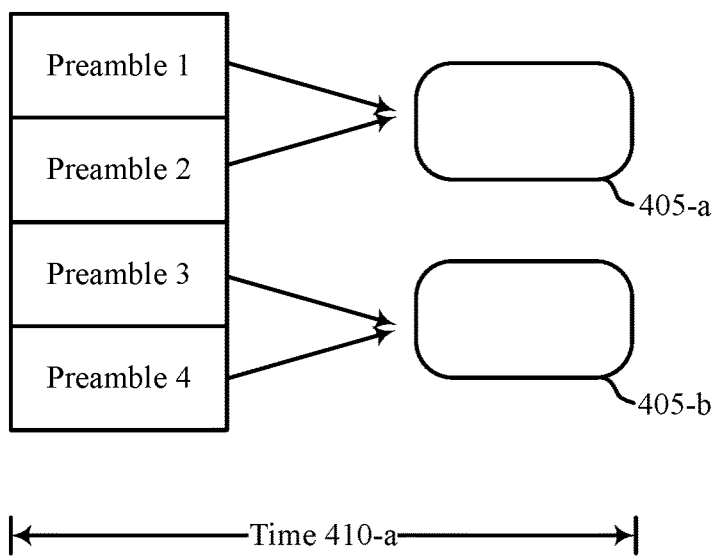
FIGS. 4A and 4B illustrate examples of one or more mapping schemes that supports techniques related to RACH operation in accordance with aspects of the present disclosure.
Figure 4B:
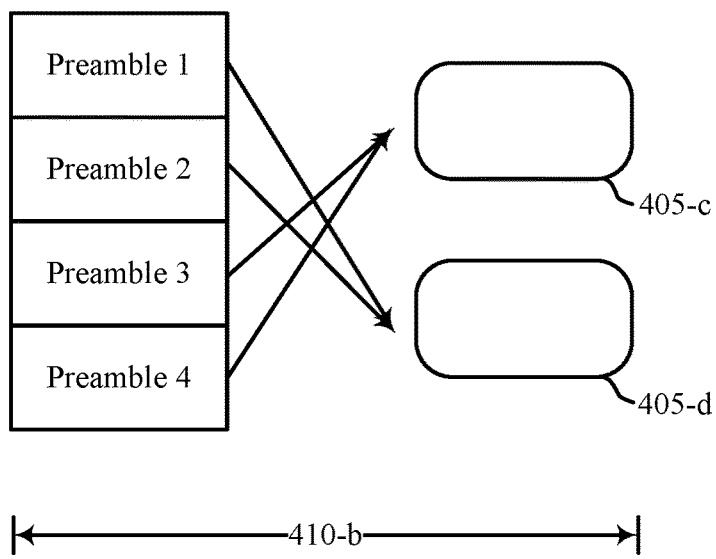

FIGS. 4A and 4B illustrate examples of mapping schemes 400-*a* and 400-*b* that support techniques related to RACH operation in accordance with aspects of the present disclosure. In some examples, the mapping schemes 400-*a* and 400-*b* may implement aspects of or be related to wireless communications systems 100 and 200, as described with reference to FIGS. 1 and 2. In some examples, the mapping schemes 400-*a* and 400-*b* may be implemented in conjunction with the described mapping scheme 300, as described with reference to FIG. 3. The mapping schemes 400-*a* and 400-*b* may, in some cases, be implemented at distinct time instances to achieve frequency diversity for random access message transmission.

As shown in FIG. 4A, at a first time instance 410-*a*, a UE 115 may implement a mapping scheme 400-*a* for random access message (e.g., msgA) transmission. The mapping scheme 400-*a* may include a many-2-one mapping between preamble sequences and PUSCH resources. For example, multiple preamble sequences (e.g., Preamble 1, Preamble 2) of a set of preamble sequences may map to a set of PUSCH resources 405-*a*. Similarly, additional preamble sequences (e.g., Preamble 3, Preamble 4) may map to an alternative set of PUSCH resources 405-*b*. One or more of the sets of PUSCH resources 405-*a* and 405-*b* may, in some examples, carry a connection request, user-plane data, CSI, and/or UCI directed to a base station 105, and may include a unique identifier within the cell. The many-2-one mapping may leverage statistical multiplexing of channel resources for better spectral efficiency.

In some examples, the UE 115 may select a preamble sequence (e.g., preamble 1) for initiating a random access procedure, such as a two-step random access procedure. As shown, the selected preamble sequence may map to a first set of PUSCH resources 405-*a*. As part of a many-2-one mapping, in some examples, a second UE 115 may select an alternative preamble sequence (e.g., preamble 2) that may include a common mapping to the set of PUSCH resources 405-*a*. Based on the common set of PUSCH resources 405-*a*, the UEs 115 may experience a signaling collision for random access message (msgA) transmission. As a result, the UEs 115 may perform a RACH collision recovery procedure and may select an alternative preamble sequence, or wait until a second time instance 410-*b* for implementing a random access procedure based on the time-varying mapping.

For example, following the mapping scheme 400-*a*, at a second time instance 410-*b*, the UE 115 may implement a mapping scheme 400-*b* for random access message (e.g., msgA) transmission. The mapping scheme 400-*b* may include an alternative many-2-one mapping between preamble sequences and PUSCH resources. For example, multiple preamble sequences (e.g., Preamble 1, Preamble 2) of a preamble set may map to the set of PUSCH resources 405-*d*. Similarly, additional preamble sequences (e.g., Preamble 3, Preamble 4) may map to an alternative set of PUSCH resources 405-*c*. In some examples, the set of PUSCH resources 405-*c* may be the same as the set of PUSCH resources 405-*a*, and the set of PUSCH resources 405-*d* may be the same as the set of PUSCH resources 405-*d*. In other examples, the sets of PUSCH resources 405-*c* and 405-*d* may include distinct resources. The sets of PUSCH resources 405-*c* and 405-*d* may carry a connection request, user-plane data, CSI, or UCI directed to the base station 105, and may include a unique identifier within the cell.

As described, the one or more techniques for a time-varying mapping between preamble sequences and allocated PUSCH resources may promote increased data rates and signaling reliability, among other advantages. In particular, a UE 115 may implement the one or more techniques for mapping a data payload associated with random access message (e.g., msgA) transmission. The time-varying mapping may increase frequency diversity and enhance capability for both intra-PUSCH and inter-PUSCH hopping.

In other examples, the described limitations may be associated with spectral efficiency and signaling capacity for two-step random access procedure. For example, multiple preamble sequences may map to a set of shared PUSCH resources to support configurations for random access message (e.g., msgA) transmission. As a result, multiple UEs 115 may select a respective preamble sequence for initiating random access procedure that maps to a common (shared) PUSCH resource. Based on the mapping, the multiple UEs 115 may conduct the same rate matching scheme for data payload mapping and transmitting a random access message. In some examples, such as high priority random access procedures, the data payloads for the one or more UEs 115 may be small and occupy a portion (e.g., a subset) of the time domain within the set of shared PUSCH resources. As a result, a portion (e.g., a subset) of the PUSCH resource may be occupied.

The described techniques may include support for dynamic resource mapping between preamble sequences associated with a set of shared PUSCH resources. In some examples, the dynamic resource mapping may include a multi-directional mapping to one or more subsets within the set of shared PUSCH resources.

Figure 5:
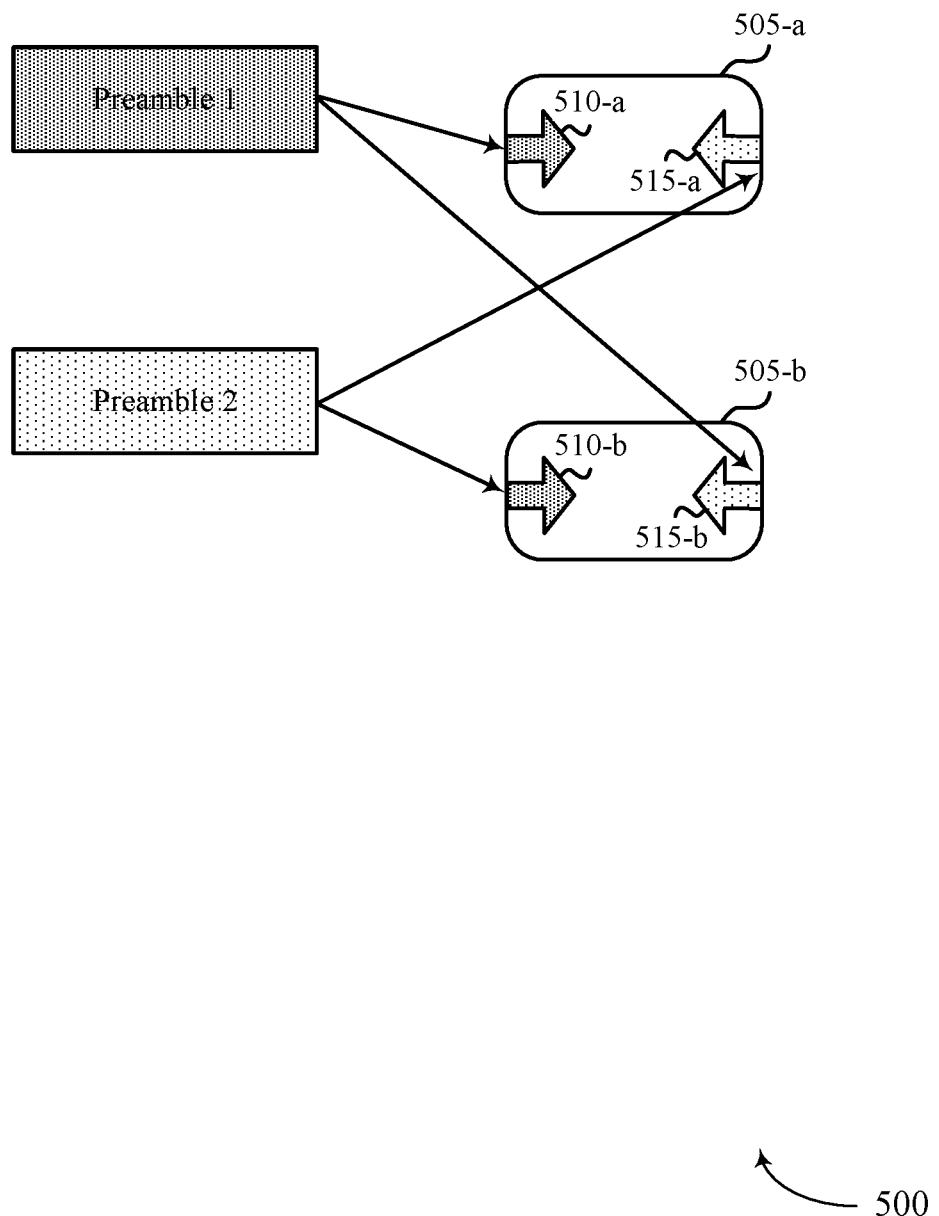
FIG. 5 illustrates an example of a mapping scheme that supports techniques related to RACH operation in accordance with aspects of the present disclosure.

FIG. 5 illustrates an example of a mapping scheme 500 that supports techniques related to RACH operation in accordance with aspects of the present disclosure. In some examples, the mapping scheme 500 may implement aspects of wireless communications systems 100 and 200, as described with reference to FIGS. 1 and 2. In some examples, the mapping scheme 500 may be implemented in conjunction with the described mapping scheme 400 and based on the mapping scheme 300 for random access procedure, as described with reference to FIGS. 3 and 4.

Before initiating a random access procedure, a base station 105 may determine a configuration (also referred to as a resource allocation) of shared PUSCH resources 505 for two-step random access procedures. For example, as described herein, the shared PUSCH resources 505 may be, or include, time resources, frequency resources, or both. In some examples the base station 105 may broadcast or multicast the configuration to one or more UEs 115 before initiating a random access procedure. In other examples, the base station 105 may transmit a specific indication of the shared PUSCH resources to each of the one or more UEs 115. Based on the configuration, the one or more UEs 115 may determine a resource mapping for transmitting a first random access message (e.g., msgA).

For example, as shown in FIG. 5, the mapping scheme 500 may include multiple preamble sequences (Preamble 1, Preamble 2) that map to the set of shared PUSCH resources 505-a. A first UE 115 may select a first preamble sequence (Preamble 1) for initiating a random access procedure. Based on the selection, the preamble sequence may serve as an index for mapping to a first subset of resources included in the PUSCH resource 505-a. For example, the first subset may correspond to an initial OFDM symbol of the PUSCH resource 505-a and include a progressive mapping 510-a in time (e.g., from left to right) across resources of the PUSCH resource 505-a.

In other examples, a second UE 115 may select a second preamble sequence (Preamble 2) for initiating a random access procedure. Based on the selection, the preamble sequence may serve as an index for mapping to a second subset of resources included in the PUSCH resource 505-a that may be different from the subset of resources associated with Preamble 1. For example, the second subset may correspond to a last OFDM symbol of the PUSCH resource 505-a and may include an inverse mapping 515-a in time (e.g., from right to left) across resources of the PUSCH resource 505-a. As a result, multiple payloads for random access message transmission may be mapped to the shared PUSCH resource 505-a in a dynamic manner. By mapping the multiple payloads based on one or more mappings, such as the progressive and inverse mappings, in time (e.g., 510-a and 515-a respectively), the PUSCH resource 505-a may avoid resource collisions associated with data payloads (e.g., small data payloads). In this example, by mapping the first subset and the second subset relative to the first OFDM symbol and the last OFDM symbol of the PUSCH resource 505-a, respectively, the multiple UEs 115 may promote signaling diversity and utilize the resources included in the PUSCH resource 505-a.

In some examples, the dynamic mapping may be based on a transmit priority associated with the one or more random access procedures. For example, each of the multiple preamble sequences (Preamble 1, Preamble 2) may be associated with a random access procedure type. A UE 115 may initiate a two-step random access procedure for high priority transmission, and select an associated preamble sequence (Preamble 1). Based on the selection, the dynamic mapping may include a subset of resources within the PUSCH resource 505-a that corresponds to an early response window to meet low latency targets. In some examples, an early response window may correspond to a subset of resources at the beginning of the shared PUSCH resource 505-a. Alternatively, in other examples, a UE 115 may initiate a random access procedure for low priority transmission and select an associated preamble sequence (Preamble 2). Based on the selection, the dynamic mapping may include a subset of resources within the PUSCH resource 505-a that follows the allocated resources for high priority transmission.

In other examples, each of the selected preambles (Preamble 1, Preamble 2) may be associated with large data payloads, and mapping the associated payloads to resources of the PUSCH resource 505-a may result in signaling overlap (collision). As a result, the dynamic mapping may include each of the preamble sequences (Preamble 1, Preamble 2) mapping to multiple sets of PUSCH resources 505-a and 505-b. For example, a first UE 115 may select a first preamble sequence (Preamble 1) for initiating a random access procedure. Based on the selection, the preamble sequence may serve as an index for mapping to a first subset of resources included in the PUSCH resource 505-a and a second subset of resources included in the PUSCH resource 505-b. For example, the first subset may correspond to an initial OFDM symbol of the PUSCH resource 505-a and may include a progressive mapping 510-a in time (e.g., from left to right) across resources of the PUSCH resource 505-a. Additionally or alternatively, the second subset may correspond to a last OFDM symbol of the PUSCH resource 505-b and may include an inverse mapping 515-b in time (e.g., from right to left) across resources of the PUSCH resource

505-*b* that may also include a progressive mapping 510-*b* similar to progressive mapping 510-*a*, discussed herein. In other examples, a second UE 115 may select a second preamble sequence (Preamble 2) for initiating a random access procedure. Based on the selection the preamble sequence may serve as an index for mapping to a subset of resources included in the PUSCH resource 505-*a* that is different from the subset of resources associated with Preamble 1, as well as a subset of resources included in the PUSCH resource 505-*b* that is different from the subset of resources associated with Preamble 1. By dynamically mapping to multiple PUSCH resources 505, the dynamic mapping may avoid associating a transmit priority to the preamble sequences.

Based on the dynamic mapping, the one or more UEs 115 may perform random access message (e.g., msgA) transmission to a base station 105. The base station 105 may receive the one or more transmissions and based on the included preamble sequences, identify the associated one or more payloads included in the set of shared PUSCH resources. For example, the preamble sequence associated with a first UE 115 may serve as an index for mapping to a first subset of resources included in the PUSCH resource 505-*a* or the PUSCH resource 505-*b*. Similarly, the preamble sequence associated with a second UE 115 may serve as an index for mapping to a second subset of resources that is different from the first subset of resources. The base station 105 may demodulate and decode the included PUSCH payloads, and transmit a second random access message (e.g., msgB) to each of the one or more UEs 115.

As described, the one or more techniques for mapping dynamically shared PUSCH resources may promote enhanced spectral efficiency and signaling capacity for random access message transmission. In particular, a base station 105 may broadcast information related to a configuration (resource allocation) for shared PUSCH resources to one or more UEs 115. A UE 115 may then transmit a random access message (e.g., msgA) based on the resource allocation for the shared PUSCH resources. The base station 105 may receive the random access message transmissions and identify one or more subsets included in the set of shared PUSCH resources. As described, in some examples, the mapping may promote low latency targets based on a transmit priority for the random access procedure or enhance signaling diversity through transmission over multiple PUSCH resources.

Figure 6:
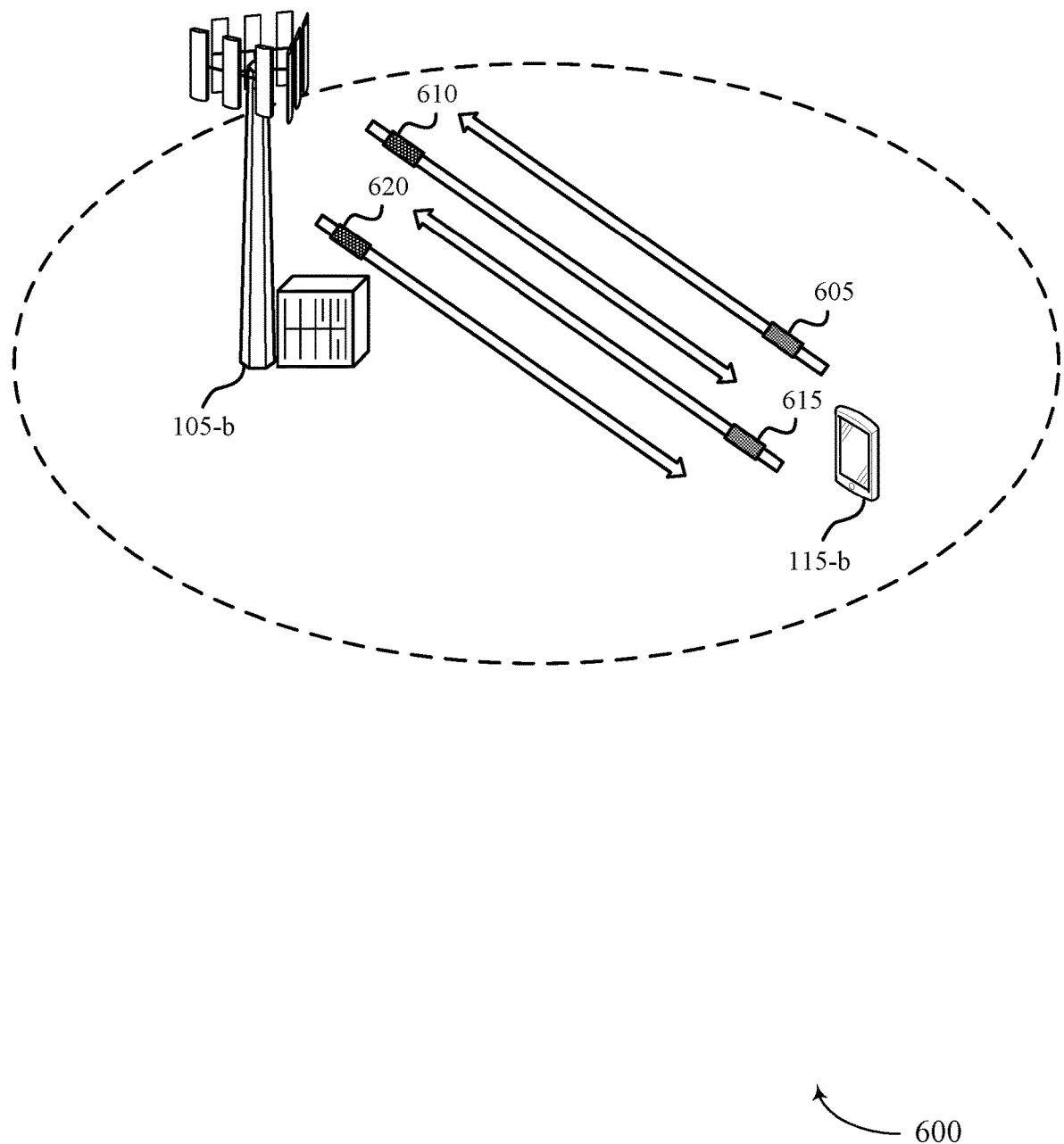
FIG. 6 illustrates an example of a wireless communications system that supports techniques related to RACH operation in accordance with aspects of the present disclosure.

FIG. 6 illustrates an example of a wireless communications system 600 that supports techniques related to RACH operation in accordance with aspects of the present disclosure. In some examples, wireless communications system 600 may include a base station 105-*b* and a UE 115-*b*, which may be examples of the corresponding devices described with reference to FIGS. 1 through 5. For example, the base station 105-*b* and the UE 115-*b* may perform connectivity establishment via a random access procedure.

In some examples, wireless communications system 600 may support multiple radio access technologies including 4G systems such as LTE systems, LTE-A systems, or LTE-A Pro systems, and 5G systems which may be referred to as NR systems. The connection procedure (such as random access procedure) between the base station 105-*b* and the UE 115-*b* may correspond to, for example, at least one of the above example radio access technologies. For example, base station 105-*b* and UE 115-*b* may perform a random access procedure to establish a connection for wired or wireless communication. In some other implementations, base station 105-*b* and UE 115-*b* may perform a random access procedure to re-establish a connection after connection failure (such as radio-link failure) with the base station 105-*b*, or to establish a connection for handover to another base station 105, or the like.

When supporting multiple random access procedures (e.g., both 2-step and 4-step random access procedures), in some examples, base station 105-*b* and UE 115-*b* may commence with one random access procedure (such as 2-step random access procedure) and fall back to another random access procedure (such as 4-step random access procedure), if needed. In some examples, the base station 105-*b* may select or assign a priority to a four-step random access procedure based in part on a parameter (such as a traffic type, network load, traffic load, etc.). Additionally, or alternatively, the base station 105-*b* may select a random access procedure based in part on capability to support the random access procedure. As part of the 4-step random access procedure, base station 105-*b* and UE 115-*b* may transmit one or more messages (handshake messages), such as a random access message 605 (also referred to herein as msg1), a random access message 610 (also referred to herein as msg2), a random access message 615 (also referred to herein as msg3), and a random access message 620 (also referred to herein as msg4).

The UE 115-*b* may initiate the random access procedure by transmitting the random access message 605, which may include a preamble (also referred to a RACH preamble, a PRACH preamble, or a sequence) that may carry information, such as a UE identifier. The purpose of the preamble transmission may be to provide an indication to the base station 105-*b* presence of a random access attempt, and to allow the base station 105-*b* to determine a delay (such as a timing delay) between the base station 105-*b* and the UE 115-*b*. The UE 115-*b* may transmit the random access message 205 to the base station 105-*b* on a PRACH, for example.

Upon receiving the random access message 605, the base station 105-*b* may respond appropriately with a random access message 610. For example, the base station 105-*b* may transmit the random access message 610 to the UE 115-*b* on a DL-SCH or a PDCCH. In some examples, the random access message 610 may have a same or a different configuration (format) compared to the random access message 605. The random access message 610 may carry information for the UE 115-*b*, where the information is determined by the base station 105-*b* based in part on information carried in the random access message 605. For example, the information in the random access message 610 may include an index of a preamble sequence detected and for which the response is valid, a timing advance parameter determined based in part on the preamble sequence detected, a scheduling grant indicating time and frequency resources for the UE 115-*b* to use for transmission of a next random access message transmission by the UE 115-*b*, or a network identifier (such as an RA-RNTI) for further communication with the UE 115-*b*, or the like.

Once the UE 115-*b* successfully receives the random access message 610, the UE 115-*b* may obtain uplink synchronization with the base station 105-*b*. In some examples, before data transmission from the UE 115-*b*, a unique identifier within the cell (such as a C-RNTI) may be assigned to the UE 115-*b*. In some examples, depending on a state (such as a connected_state, ideal_state) of the UE 115-*b* there may be a need for additional message (such as a connection request message) exchange for setting up the connection between the base station 105-*b* and the UE 115-*b*. The UE 115-*b* may transmit any additional messages, for example, the random access message 615 to the base station 105-*b* using the UL-SCH resources (or PUSCH resources) assigned in the random access message 610. The random access message 610 may include a UE identifier for contention resolution. If the UE 115-*b* is in a connected-_state, for example, the UE identifier may be a C-RNTI. Otherwise, the UE identifier may be specific to the UE 115-*b*.

The base station 105-*b* may receive the random access message 615 and may respond properly, for example, by transmitting the random access message 620, which may be a contention resolution message. The UE 115-*b* may receive the random access message 620 and compare an identifier (such as a network identifier) in the random access message 620 to the identifier specified in the random access message 615. When the identifiers match, the corresponding UE 115-*b* may declare the random access procedure successful and establish a connection with the base station 105-*b*.

Although the connection procedure as described in FIG. 6 may be effective for facilitating random access for the UE 115-*b*, there may be some limitations in physical layer procedures related to the random access procedure. For example, an uplink grant included in a random access response message (e.g., msg2) may be formatted to be similar to a fallback DCI format, as shown.

| Random access response grant field | Number of bits |
|---|---|
| Frequency hopping flag | 1 |
| PUSCH frequency resource allocation | 14 |
| PUSCH time resource allocation | 4 |
| Modulation and coding scheme | 4 |
| TPC command for PUSCH | 3 |
| CSI request | 1 |

However, the number of allocated bits (PUSCH frequency resource allocation, PUSCH time resource allocation) for transmitting a subsequent random access message (e.g., msg3) may be limited to reduce the resource overhead (number of bits) of the random access response.

In some examples, the described procedure may provide insufficient reporting capability and support for enhanced antenna techniques associated with four-step random access procedure. For example, a wireless communications system may utilize unlicensed radio frequency spectrum bands and employ LBT procedures to ensure a frequency channel is clear before transmitting a random access message (e.g., msg3). In periods of high data traffic, it may be beneficial to have multiple opportunities for transmitting the random access message through LBT diversity. To save resource overhead, enhanced antenna techniques may be desired for transmitting multiple random access messages within a set of PUSCH resources. However, as formatted, the uplink grant included in the random access response message may be insufficient for indicating antenna fields (e.g., DMRS) ports for multiple random access message signaling by one or more UEs 115 over a set of PUSCH resources.

The described techniques may include support for channel access methods that employ antenna arrays and multi-dimensional nonlinear signal processing techniques to provide increases in capacity (e.g., signaling diversity) and quality for random access message transmission. For example, multiple UEs 115 may implement spatial-division multiple access (SDMA) techniques for transmitting multiple random access messages (e.g., msg3) on a common set of PUSCH resources.

Figure 7:
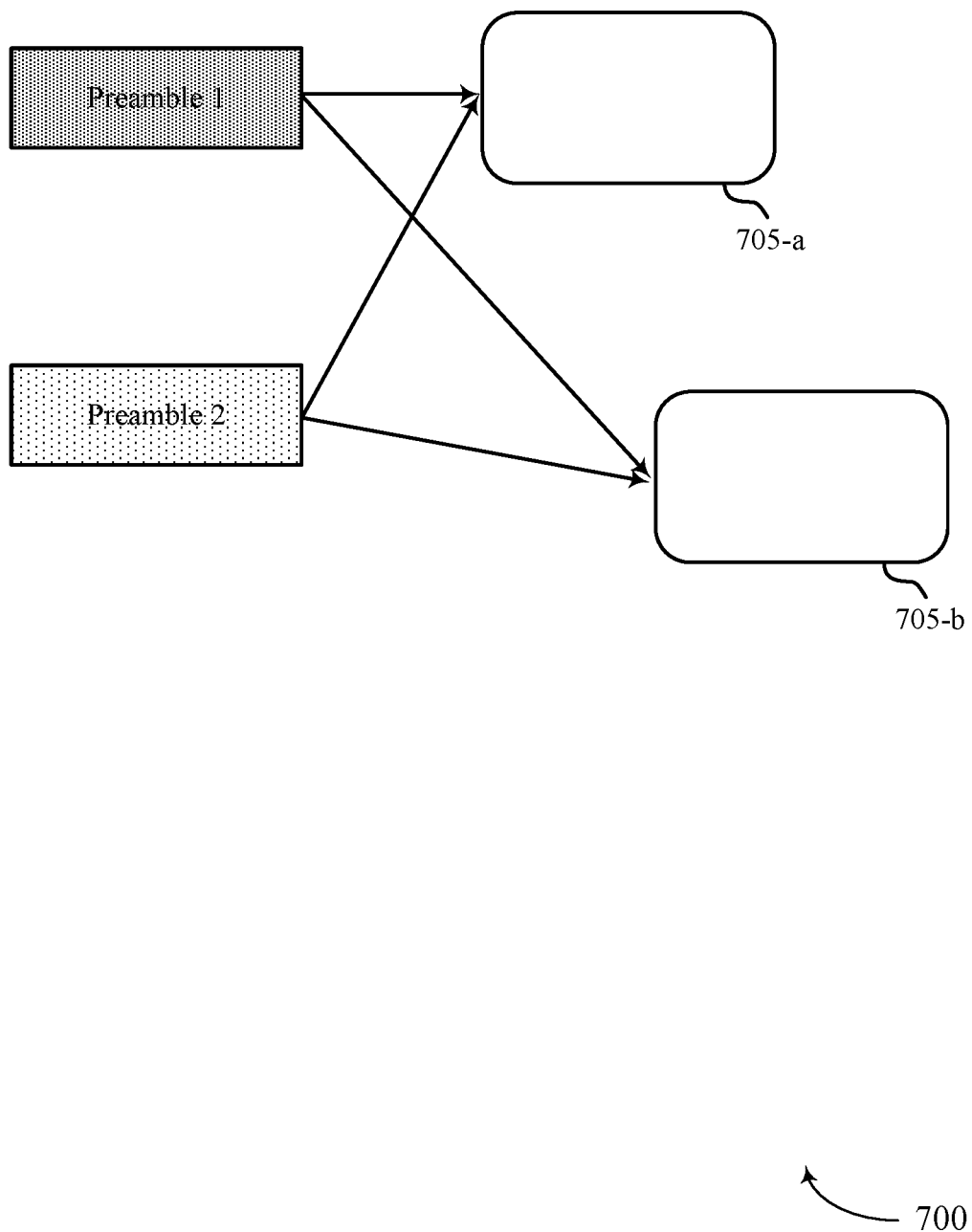
FIG. 7 illustrates an example of a mapping scheme that supports techniques related to RACH operation in accordance with aspects of the present disclosure.

FIG. 7, for example, illustrates an example of a mapping scheme 700 that supports techniques related to RACH operation in accordance with aspects of the present disclosure. In some examples, the mapping scheme 700 may implement aspects of wireless communications systems 100 and 200, as described with reference to FIGS. 1 and 2.

For example, as shown in FIG. 7, the mapping scheme 700 may include multiple preamble sequences (Preamble 1, Preamble 2). In some examples, a first UE 115 may select a preamble sequence (Preamble 1) for initiating a random access procedure. In some examples, the random access procedure may correspond to a four-step random access procedure. The first UE 115 may transmit a first random access message (e.g., msg1) carrying a preamble sequence to a base station 105. Additionally or alternatively, a second UE 115 may select an alternative preamble sequence (Preamble 2) for initiating a random access procedure. In some examples, the random access procedure may correspond to a four-step random access procedure and the second UE 115 may transmit a random access message (e.g., msg1) carrying the alternative preamble sequence to the base station 105. The base station 105 may receive the random access message transmissions and identify the preamble sequences associated with the first UE 115 and the second UE 115, respectively. Based on the included preamble sequences, the base station 105 may determine a PUSCH resource mapping. In some examples, the mapping may further include a set of DMRS ports for multiple random access message mapping based on an SDMA procedure.

For example, the base station 105 may determine a mapping to the set of PUSCH resources 705-*a* and the set of PUSCH resources 705-*b* based on a selected preamble sequence (Preamble 1). As an example, the set of PUSCH resources 705-*a* and the set of PUSCH resources 705-*b* may be based on a mapping associated with a preamble, such as Preamble 1. For each of the sets of PUSCH resources 705, the base station 105 may determine a set of DMRS ports for the random access transmission. In some examples the DMRS ports assigned for the PUSCH resources 705-*a* may be different from the DMRS ports assigned for the PUSCH resources 705-*b*. In other cases, the DMRS ports assigned for the sets of PUSCH resources 705-*a* and 705-*b* may be the same.

Similarly, the base station 105 may determine a mapping to the set of PUSCH resources 705-*a* and the set of PUSCH resources 705-*b* based on the selected alternative preamble sequence (Preamble 2). As an example, the set of PUSCH resources 705-*a* and the set of PUSCH resources 705-*b* may be based on a mapping associated with a preamble, such as Preamble 2. For each of the sets of PUSCH resources 705, the base station 105 may also determine a set of DMRS ports for the random access transmission. In some examples, the DMRS ports assigned for the PUSCH resources 705-*a* may be different from the DMRS ports assigned for the PUSCH resources 705-*b*. In other cases, the DMRS ports assigned for the sets of PUSCH resources 705-*a* and 705-*b* may be the same.

Within the set of PUSCH resources 705-*a*, the set of DMRS ports associated with Preamble 1 may be different from the set of DMRS ports associated with Preamble 2. As a result, the PUSCH resources 705-*a* may carry multiple random access messages over the distinct DMRS ports (via SDMA). Similarly, to support SDMA based transmission on the PUSCH resources 705-*b*, the set of DMRS ports associated with Preamble 1 may be different from the set of DMRS ports associated with Preamble 2. Based on the mapping, the base station 105 may then configure a random access response message (e.g., msg2) for each of the respective UEs 115. The random access response messages may each be formatted to include an uplink grant to indicate the respective PUSCH resource mapping and the antenna field mapping for performing SDMA-based multiple random access message transmission on the set of PUSCH resources 705-*a* or 705-*b*.

In some examples, the base station 105 may assign a common set of DMRS ports for each of the sets of PUSCH resources 705 mapped to a respective preamble sequence. Within the random access response message (msg2), the base station may indicate a first set of PUSCH resources (e.g., PUSCH 705-*a*) mapped to the preamble sequence. The base station 105 may also describe the additional PUSCH resources (e.g., PUSCH 705-*b*) as relative values (e.g., "delta" values) to the first set of PUSCH resources in time and frequency. That is, the base station 105 may format the random access response to include a single set of DMRS ports, an indication of a first PUSCH opportunity (705-*a*), and an indication of a second PUSCH opportunity (705-*b*) relative to the first. By including a single set of DMRS ports and relative values for indicating additional PUSCH resources, the base station 105 may reduce the number of random access response bits included in an uplink grant of the random access response message.

In other examples, the wireless communications system may include a pre-configured set of PUSCH opportunities for four-step random access procedure. Based on the configuration, the base station 105 may indicate an index value of the pre-configured set for a first set of PUSCH resources (e.g., PUSCH 705-*a*) mapped to a respective preamble sequence. Similarly, the base station 105 may indicate an alternative index value for the second set of PUSCH resources (e.g., PUSCH 705-*b*). In addition, the base station 105 may indicate indices of a first set of DMRS ports for signaling over the set of PUSCH resources 705-*a* and indices of a second set of DMRS ports for signaling over the set of PUSCH resources 705-*b*. By including index values for the mapped PUSCH resources, the base station 105 may reduce the number of random access response bits included in an uplink grant of the random access response message.

The base station 105 may then transmit a formatted random access response message (msg2) to each of one or more UEs 115. As described, to support SDMA based multiple random access message (msg3) transmission on a set of PUSCH resources 705, the base station 105 may include an indication of DMRS ports for signaling within each random access response. The one or more UEs 115 may receive a formatted random access response and obtain uplink synchronization for a next random access message (msg3) transmission. Based on the support for SDMA-based multiple random access message transmission, the first UE 115 and the second UE 115 may each transmit a random access message (msg3) using a common set of PUSCH resources 705-*a* or 705-*b*. For example, the first UE 115 may transmit the random access message on the set of PUSCH resources 705-*a* and using a first set of DMRS ports indicated in a received random access response. In addition, the second UE 115 may transmit an alternative random access message on the set of PUSCH resources 705-*a* and using a second set of DMRS ports indicated in a received random access response.

As described, the one or more techniques for SDMA based multiple random access message (msg3) transmission over a set of allocated PUSCH resources may conserve time and frequency resources for random access. In particular, a base station 105 may determine a mapping for a preamble sequence that includes a mapping to PUSCH resources and an assigned set of DMRS ports. Based on the determination, the base station 105 may format a random access response for a UE 115. Following the random access response, a UE 115 may perform random access message (msg3) transmission that is multiplexed with one or more additional random access message opportunities on a set of PUSCH resources. The random access message and the one or more additional random access message opportunities may be signaled on distinct DMRS ports to promote SDMA transmission. As a result, the one or more techniques may promote enhanced spectral efficiency and signaling capacity for random access message transmission.

Figure 8:
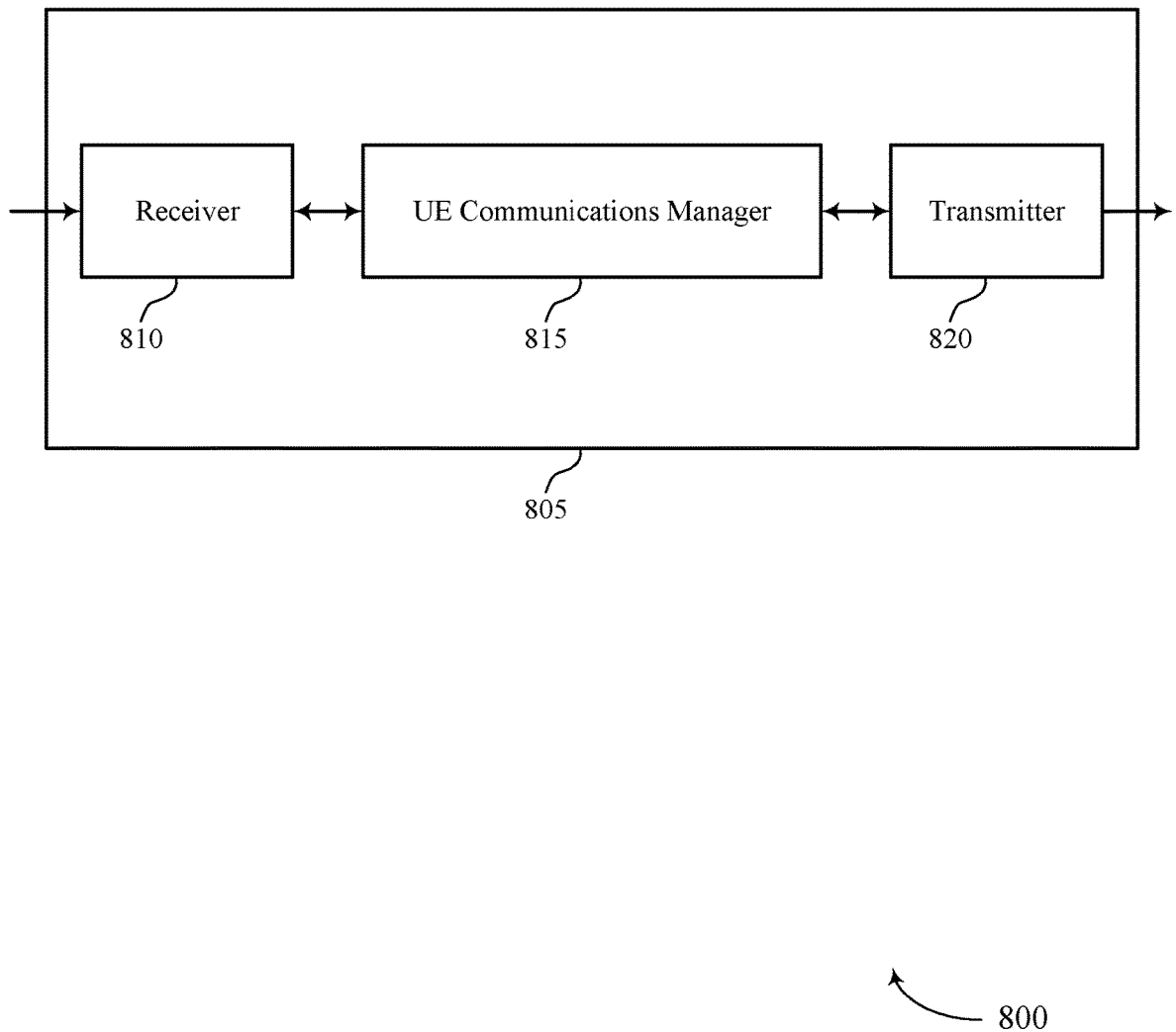
FIGS. 8 and 9 show block diagrams of devices that support techniques related to RACH operation in accordance with aspects of the present disclosure.

FIG. 8 shows a block diagram 800 of a device 805 that supports techniques related to RACH operation in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques related to RACH operation). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may determine a transmit priority for a first random access message of a random access procedure based on whether the first random access message spans a set of orthogonal frequency division multiplexing symbols that is less than a first threshold or includes information having a priority above a second threshold, transmit, to a base station, the first random access message based on the transmit priority, the first random access message including a random access preamble and a connection request, and monitor a downlink channel to receive a second random access message based on the first random access message, the second random access message including information for establishing a connection between the UE and the base station.

The UE communications manager 815 may also determine a random access preamble for a first random access message of a random access procedure, the first random access message associated with a random access occasion and a transmission priority, transmit, to a base station based on the determining, the first random access message of a random access procedure, the first random access message including the random access preamble and indicating a timing configuration for a response window of a downlink channel, and monitor the response window to receive a second random access message including information for establishing a connection between the UE and the base station.

The UE communications manager 815 may also determine a random access preamble for a first random access message of a random access procedure, the first random access message associated with a random access occasion and a transmission priority, identify a set of physical uplink shared channel resources corresponding to the random access preamble based on determining the random access preamble, the set of physical uplink shared channel resources based on a time-varying mapping, and transmit, to a base station on the set of physical uplink shared channel resources, a first random access message of a random access procedure, the first random access message including a connection request and the random access preamble.

The UE communications manager 815 may also transmit, to a base station, a first random access message of a random access procedure, the first random access message including a random access preamble, receive a second random access message based on the first random access message, the second random access message including an indication of a first set of physical uplink shared channel resources associated with the random access preamble and a second set of physical uplink shared channel resources associated with the random access preamble, and transmit, to the base station based on the indication, a third random access message that is multiplexed with one or more additional random access message opportunities on resources of the first set of physical uplink shared channel or resources of the second set of physical uplink shared channel resources. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
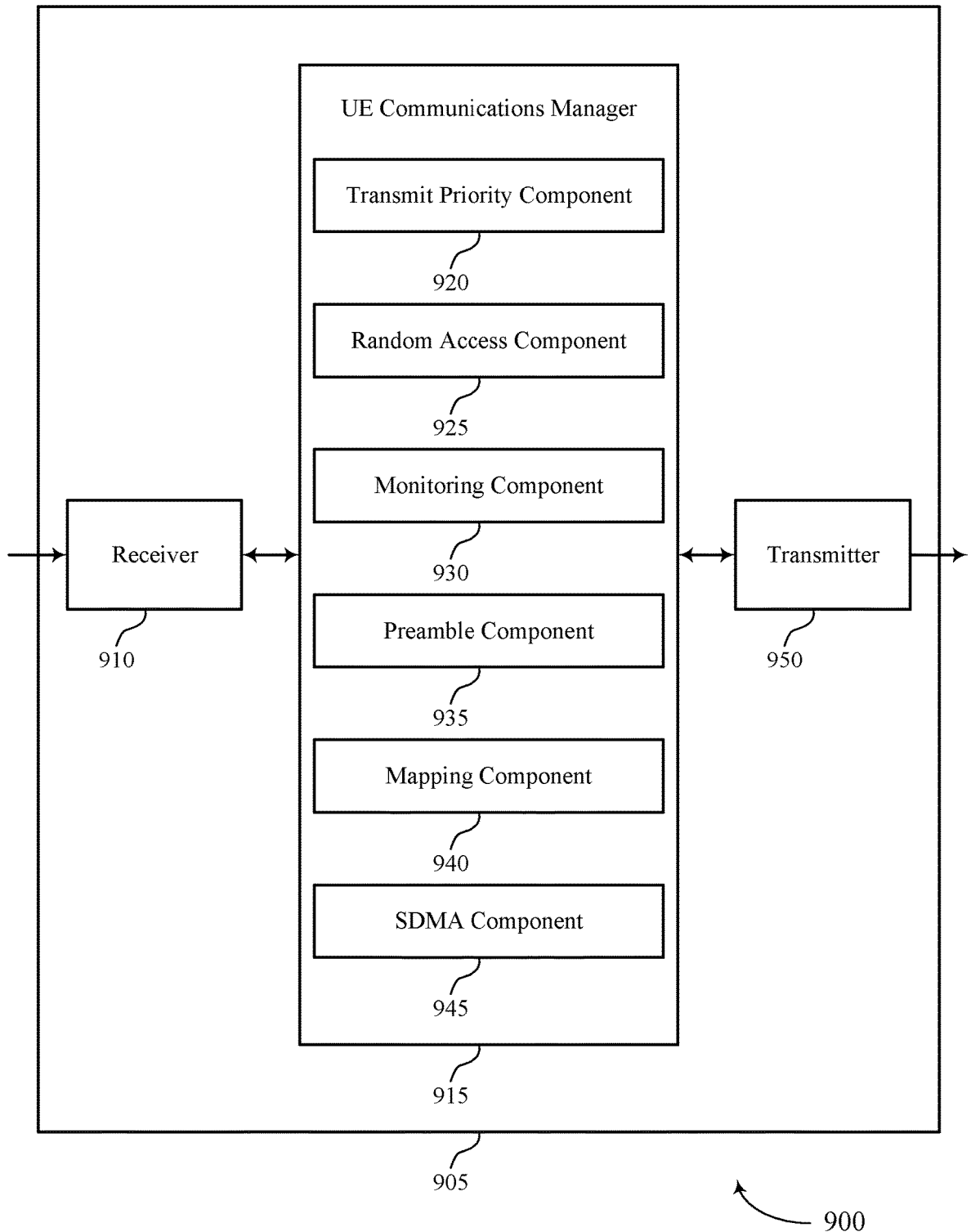

FIG. 9 shows a block diagram 900 of a device 905 that supports techniques related to RACH operation in accordance with aspects of the present disclosure. The device 905 may be an example of aspects of a device 805, or a UE 115 as described herein. The device 905 may include a receiver 910, a UE communications manager 915, and a transmitter 950. The device 905 may also include a processor. Each of these components may be in communication with one another (e.g., via one or more buses).

The receiver 910 may receive information such as packets, user data, or control information associated with various information channels (e.g., control channels, data channels, and information related to techniques related to RACH operation). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a transmit priority component 920, a random access component 925, a monitoring component 930, a preamble component 935, a mapping component 940, and a SDMA component 945. The UE communications manager 915 may be an example of aspects of the UE communications manager 1110 described herein.

The actions performed by the communications manager 915 as described herein may be implemented to realize one or more potential advantages. One implementation may enable a base station to perform improved physical layer procedures, including RACH configurations and communication schemes. Such procedures may enable a UE to determine a transmit priority for a random access message, which may result in higher data rates and more efficient communications (e.g., less communication errors), among other advantages.

Based on implementing the procedures as described herein, a processor of a UE or base station (e.g., a processor controlling the receiver 910, the communications manager 915, the transmitter 920, or a combination thereof) may enhance signaling reliability in a communications system, while ensuring relatively efficient communications. For example, the random access procedures described herein may leverage a transmission priority for random access messages, which may realize improved spectral efficiency and power savings, among other benefits.

The transmit priority component 920 may determine a transmit priority for a first random access message of a random access procedure based on whether the first random access message spans a set of orthogonal frequency division multiplexing symbols that is less than a first threshold or includes information having a priority above a second threshold.

In some examples, the random access component 925 may transmit, to a base station, the first random access message based on the transmit priority, the first random access message including a random access preamble and a connection request. In other examples, the random access component 925 may transmit, to a base station based on the determining, the first random access message of a random access procedure, the first random access message including the random access preamble and indicating a timing configuration for a response window of a downlink channel. In other examples, the random access component 925 may transmit, to a base station on a set of physical uplink shared channel resources, a first random access message of a random access procedure.

The monitoring component 930 may monitor a downlink channel to receive a second random access message based on the first random access message, the second random access message including information for establishing a connection between the UE and the base station.

The preamble component 935 may determine a random access preamble for a first random access message of a random access procedure, the first random access message associated with a random access occasion and a transmission priority.

In some examples, the mapping component 940 may identify a set of physical uplink shared channel resources corresponding to the random access preamble based on determining the random access preamble, the set of physical uplink shared channel resources based on a time-varying mapping. In other examples, the mapping component 940 may receive a second random access message based on the first random access message, the second random access message including an indication of a first set of physical uplink shared channel resources associated with the random access preamble and a second set of physical uplink shared channel resources associated with the random access preamble.

The SDMA component 945 may transmit, to the base station based on the indication, a third random access message that is multiplexed with one or more additional random access message opportunities on resources of the first set of physical uplink shared channel or resources of the second set of physical uplink shared channel resources.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 950 may transmit signals generated by other components of the device 905. In some examples, the transmitter 950 may be collocated with a receiver 910 in a transceiver module. For example, the transmitter 950 may be an example of aspects of the transceiver 1120 described with reference to FIG. 11. The transmitter 950 may utilize a single antenna or a set of antennas.

Figure 10:
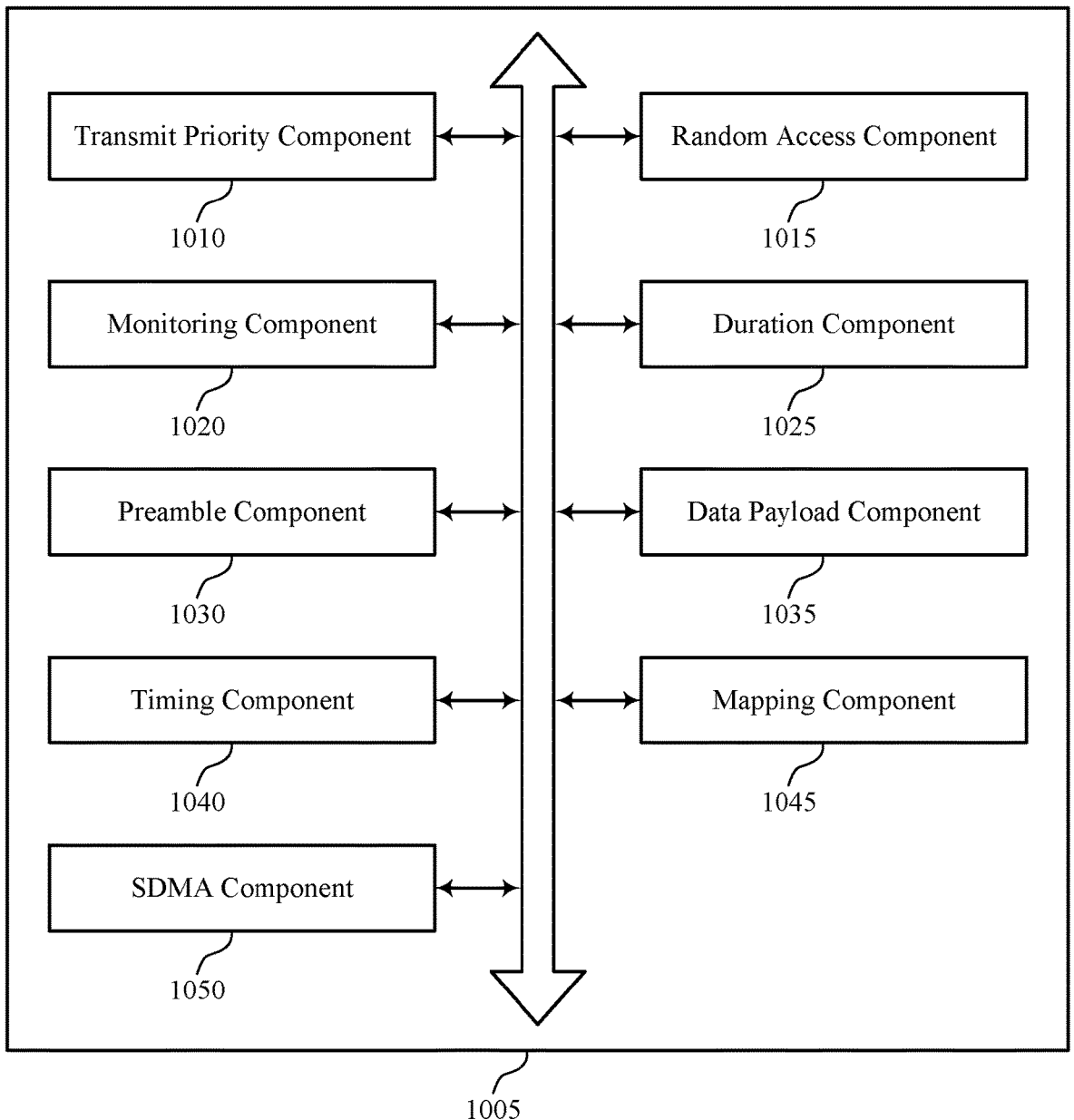
FIG. 10 shows a block diagram of a communications manager that supports techniques related to RACH operation in accordance with aspects of the present disclosure.

FIG. 10 shows a block diagram 1000 of a UE communications manager 1005 that supports techniques related to RACH operation in accordance with aspects of the present disclosure. The UE communications manager 1005 may be an example of aspects of a UE communications manager 815, a UE communications manager 915, or a UE communications manager 1110 described herein. The UE communications manager 1005 may include a transmit priority component 1010, a random access component 1015, a monitoring component 1020, a duration component 1025, a preamble component 1030, a data payload component 1035, a timing component 1040, a mapping component 1045, and a SDMA component 1050. Each of these modules may communicate, directly or indirectly, with one another (e.g., via one or more buses).

The transmit priority component 1010 may determine a transmit priority for a first random access message of a random access procedure based on whether the first random access message spans a set of orthogonal frequency division multiplexing symbols that is less than a first threshold or includes information having a priority above a second threshold.

In some examples, determining the transmit priority for the first random access message includes information having the priority above the second threshold based on one or more of: a preamble partition, a RACH occasion, or a signaling indication by the base station, where determining the transmit priority for the first random access message is based on determining the first random access message includes information above the second threshold.

In some examples, the transmit priority component 1010 may receive, from the base station, an indication of a capability of the base station for communication, the communication having a transmit priority above a threshold, where the determining is based on the indication of the capability of the base station.

In some examples, the first transmit priority corresponds to a highest configured transmit power of a transmit power allocation, and where the second transmit priority corresponds to a second transmit power of the transmit power allocation that is lower than the highest configured transmit power. In some examples, the transmit priority for the first random access message corresponds to a highest configured transmit power of a transmit power allocation. In some examples, the first threshold corresponds to a set of orthogonal frequency division multiplexing symbols and the second threshold corresponds to a transmit priority of a transmit power allocation.

The random access component 1015 may transmit, to a base station, the first random access message based on the transmit priority, the first random access message including a random access preamble and a connection request. In some examples, the random access component 1015 may transmit, to a base station on a set of physical uplink shared channel resources, a first random access message of a random access procedure.

In some examples, the random access component 1015 may receive a fourth random access message based on a third random access message or a fourth random access message, the fourth random access message including a connection setup message for establishing a connection between the UE and the base station.

In some examples, the second random access message includes a random access response and a connection setup message for the random access procedure. In some examples, the random access procedure is a two-step random access procedure. In some examples, the random access procedure is a four-step random access procedure.

In some examples, a random access occasion associated with the random access message includes information supporting fallback from the random access procedure to an alternative random access procedure. In some examples, the random access procedure is a two-step random access procedure and the alternative random access procedure is a four-step random access procedure.

The monitoring component 1020 may monitor a downlink channel to receive a second random access message based on the first random access message, the second random access message including information for establishing a connection between the UE and the base station. In some examples, the monitoring component 1020 may monitor the response window to receive a second random access message including information for establishing a connection between the UE and the base station. In some examples, the second random access message includes a random access response and a connection setup message for the random access procedure.

The duration component 1025 may determine that the first random access message spans the set of orthogonal frequency division multiplexing symbols that is less than the first threshold, where determining the transmit priority for the first random access message is based on determining that the first random access message spans the set of orthogonal frequency division multiplexed symbols.

In some examples, a combination of the random access preamble and the connection request span the set of orthogonal frequency division multiplexed symbols. In some examples, a combination of the random access preamble, a gap period spanning a duration, and the connection request span the set of orthogonal frequency division multiplexed symbols.

The preamble component 1030 may determine a random access preamble for a first random access message of a random access procedure, the first random access message associated with a random access occasion and a transmission priority. In some examples, the preamble component 1030 may determine a first transmit priority for the random access preamble.

The data payload component 1035 may determine a second transmit priority for the connection request based on a data payload in the connection request. In some examples, the data payload includes one or more of hybrid automatic repeat request acknowledgement information, a scheduling request, or channel state information.

The timing component 1040 may identify a timing configuration for monitoring a downlink channel for a second random access message. In some examples, the first random access message includes a connection request and the random access preamble, the random access preamble including the timing configuration. In some examples, the first random access message includes the random access preamble and a connection request including the timing configuration.

The mapping component 1045 may identify a set of physical uplink shared channel resources corresponding to the random access preamble based on determining the random access preamble, the set of physical uplink shared channel resources based on a time-varying mapping.

In some examples, the mapping component 1045 may receive a second random access message based on the first random access message, the second random access message including an indication of a first set of physical uplink shared channel resources associated with the random access preamble and a second set of physical uplink shared channel resources associated with the random access preamble.

In some examples, the mapping component 1045 may determine, at a first time period based on the time-varying mapping, a first set of frequency resources associated with the random access occasion and a second set of frequency resources associated with the set of physical uplink shared channel resources. In some examples, the mapping component 1045 may determine, at a second time period based on the time-varying mapping, a third set of frequency resources associated with the random access occasion and a fourth set of frequency resources associated with the set of physical uplink shared channel resources. In some examples, the mapping component 1045 may identify a set of frequency resources associated with the random access occasion.

In some examples, the mapping component 1045 may determine, at a first time period based on the time-varying mapping, a first frequency offset for the set of physical uplink shared channel resources, the first frequency offset relative to the random access occasion. In some examples, the mapping component 1045 may determine, at a second time period based on the time-varying mapping, a second frequency offset for the set of physical uplink shared channel resources, the second frequency offset relative to the random access occasion.

In some examples, the mapping component 1045 may determine, at a first time period based on the time-varying mapping, a first set of physical uplink shared channel resources corresponding to the random access preamble. In some examples, the mapping component 1045 may determine, at a second time period based on the time-varying mapping, a second set of physical uplink shared channel resources corresponding to the random access preamble.

In some examples, the mapping component 1045 may determine a second set of demodulation reference signal ports associated with the third random access message on the second set of physical uplink shared channel resources, the second set of demodulation reference signal ports different from the demodulation reference signal ports associated with the one or more additional random access message opportunities the second set of physical uplink shared channel resources. In some examples, the first set of physical uplink shared channel resources correspond to a first set of random access preambles that include the random access preamble, and where the second set of physical uplink shared channel resources correspond to a second set of random access preambles that include the random access preamble.

In some examples, the first set of physical uplink shared channel resources are associated with a first set of demodulation reference signal ports, and where the second set of physical uplink shared channel resources are associated with a second set of demodulation reference signal ports. In some examples, the first set of physical uplink shared channel resources are associated with a second random access preamble and the second set of physical uplink shared channel resources are associated with the second random access preamble.

The SDMA component 1050 may transmit, to the base station based on the indication, a third random access message that is multiplexed with one or more additional random access message opportunities on resources of the first set of physical uplink shared channel or resources of the second set of physical uplink shared channel resources.

In some examples, the SDMA component 1050 may determine a first set of demodulation reference signal ports associated with the third random access message on the first set of physical uplink shared channel resources, the first set of demodulation reference signal ports different from the demodulation reference signal ports associated with the one or more additional random access message opportunities on the first set of physical uplink shared channel resources. In some examples, the third random access message is multiplexed with the one or more additional random access message opportunities that are associated with a second UE based on a space-division multiple access procedure.

In some examples, the first set of demodulation reference signal ports and the second set of demodulation reference signal ports are different. In some examples, the second random access message indicates a first index value corresponding to the first set of physical uplink shared channel resources and a second index value corresponding to the second set of physical uplink shared channel resources.

In some examples, the first set of demodulation reference signal ports and the second set of demodulation reference signal ports are the same. In some examples, the second random access message indicates the first set of physical uplink shared channel resources, and where the second random access message indicates the second set of physical uplink shared channel resources relative to the first set of physical uplink shared channel resources.

The UE communications manager 1005, or its sub-components, may be implemented in hardware, code (e.g., software or firmware) executed by a processor, or any combination thereof. If implemented in code executed by a processor, the functions of the UE communications manager 1005, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 1005, or its sub-components, may be physically located at various positions, including being distributed such that portions of functions are implemented at different physical locations by one or more physical components. In some examples, the UE communications manager 1005, or its sub-components, may be a separate and distinct component in accordance with various aspects of the present disclosure. In some examples, the UE communications manager 1005, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 11:
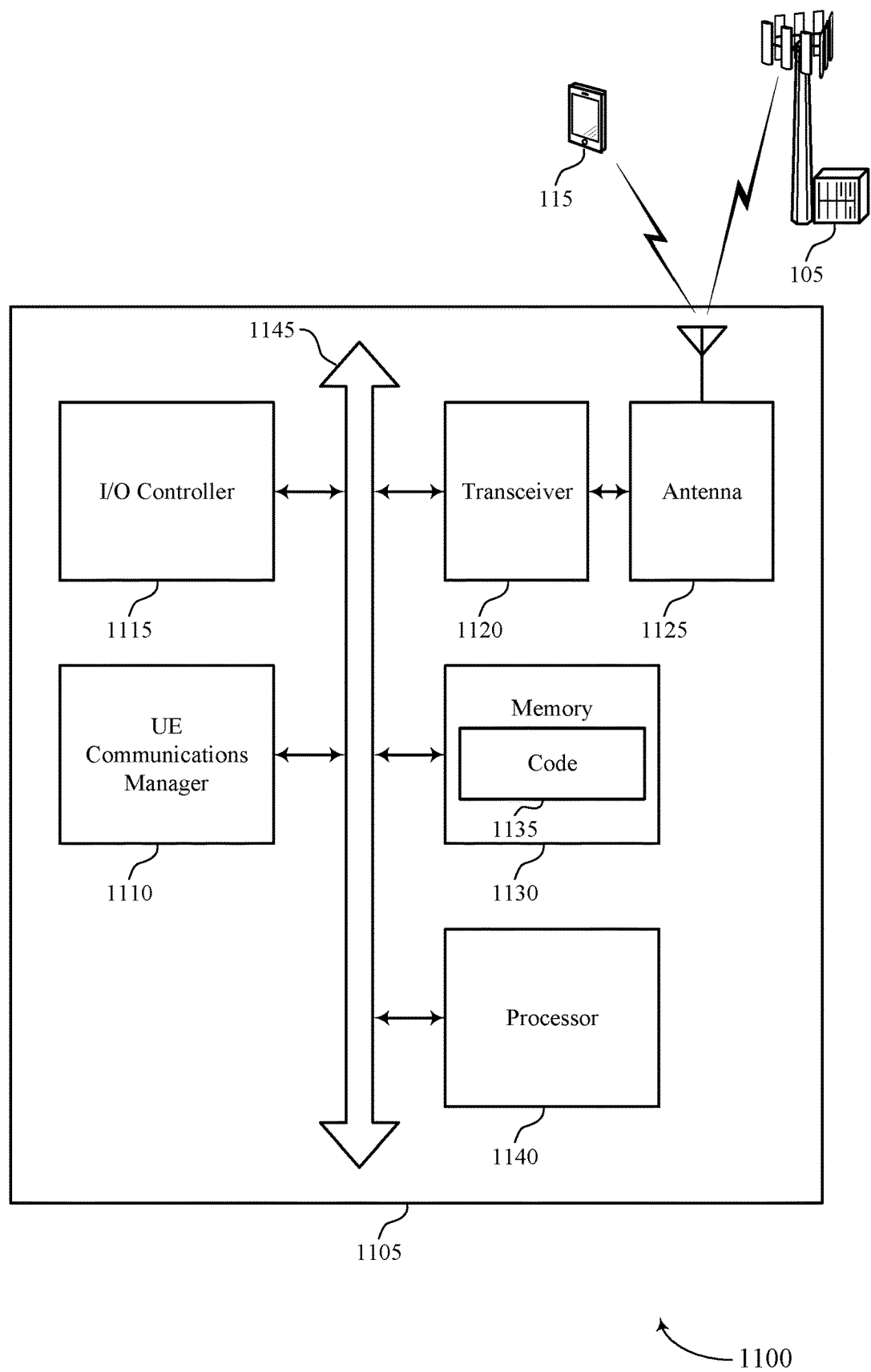
FIG. 11 shows a diagram of a system including a device that supports techniques related to RACH operation in accordance with aspects of the present disclosure.

FIG. 11 shows a diagram of a system 1100 including a device 1105 that supports techniques related to RACH operation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may determine a transmit priority for a first random access message of a random access procedure based on whether the first random access message spans a set of orthogonal frequency division multiplexing symbols that is less than a first threshold or includes information having a priority above a second threshold, transmit, to a base station, the first random access message based on the transmit priority, the first random access message including a random access preamble and a connection request, and monitor a downlink channel to receive a second random access message based on the first random access message, the second random access message including information for establishing a connection between the UE and the base station.

The UE communications manager 1110 may also determine a random access preamble for a first random access message of a random access procedure, the first random access message associated with a random access occasion and a transmission priority, transmit, to a base station based on the determining, the first random access message of a random access procedure, the first random access message including the random access preamble and indicating a timing configuration for a response window of a downlink channel, and monitor the response window to receive a second random access message including information for establishing a connection between the UE and the base station.

The UE communications manager 1110 may also determine a random access preamble for a first random access message of a random access procedure, the first random access message associated with a random access occasion and a transmission priority, identify a set of physical uplink shared channel resources corresponding to the random access preamble based on determining the random access preamble, the set of physical uplink shared channel resources based on a time-varying mapping, and transmit, to a base station on the set of physical uplink shared channel resources, a first random access message of a random access procedure, the first random access message including a connection request and the random access preamble.

The UE communications manager 1110 may also transmit, to a base station, a first random access message of a random access procedure, the first random access message including a random access preamble, receive a second random access message based on the first random access message, the second random access message including an indication of a first set of physical uplink shared channel resources associated with the random access preamble and a second set of physical uplink shared channel resources associated with the random access preamble, and transmit, to the base station based on the indication, a third random access message that is multiplexed with one or more additional random access message opportunities on resources of the first set of physical uplink shared channel or resources of the second set of physical uplink shared channel resources.

The UE communications manager 1110, or its sub-components, may be implemented in hardware, code (e.g., software or firmware) executed by a processor, or any combination thereof. If implemented in code executed by a processor, the functions of the UE communications manager 1110, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 1110, or its sub-components, may be physically located at various positions, including being distributed such that portions of functions are implemented at different physical locations by one or more physical components. In some examples, the UE communications manager 1110, or its sub-components, may be a separate and distinct component in accordance with various aspects of the present disclosure. In some examples, the UE communications manager 1110, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The I/O controller 1115 may manage input and output signals for the device 1105. The I/O controller 1115 may also manage peripherals not integrated into the device 1105. In some examples, the I/O controller 1115 may represent a physical connection or port to an external peripheral. In some examples, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some examples, the I/O controller 1115 may be implemented as part of a processor. In some examples, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some examples, the wireless device may include a single antenna 1125. However, in some examples the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some examples, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques related to RACH operation).

The code 1135 may include instructions to implement aspects of the present disclosure, including instructions to support wireless communications. The code 1135 may be stored in a non-transitory computer-readable medium such as system memory or other type of memory. In some examples, the code 1135 may not be directly executable by the processor 1140 but may cause a computer (e.g., when compiled and executed) to perform functions described herein.

Figure 12:
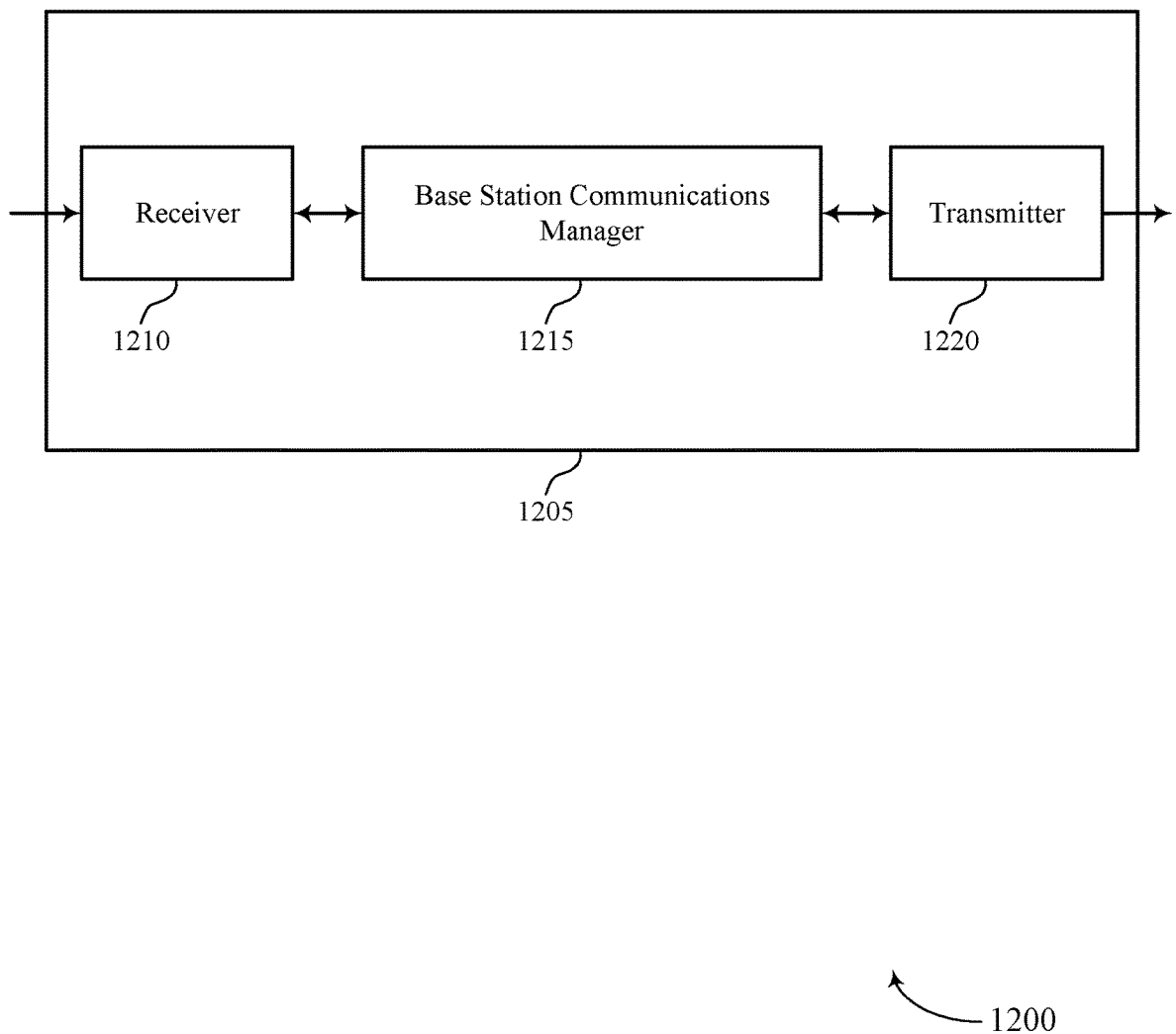
FIGS. 12 and 13 show block diagrams of devices that support techniques related to RACH operation in accordance with aspects of the present disclosure.

FIG. 12 shows a block diagram 1200 of a device 1205 that supports techniques related to RACH operation in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques related to RACH operation). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit, to a UE, an indication of a capability of the base station for communication, the communication having a transmit priority above a threshold, receive, from the UE based on the indication, a first random access message of a random access procedure, the first random access message indicating a timing configuration for a response window of a downlink channel, and transmit, to the UE during the response window, a second random access message including information for establishing a connection between the UE and the base station.

The base station communications manager 1215 may also receive, from a UE, a first random access message of a random access procedure, the first random access message including a random access preamble, transmit the second random access message based on the indication, determine a format of a second random access message based on the first random access message, the second random access message including an indication of a first set of physical uplink shared channel resources associated with the random access preamble and a second set of physical uplink shared channel resources associated with the random access preamble, and receive, based on the second random access message, a third random access message from the UE, the third random access message multiplexed with a fourth random access message from a second UE on resources of the first set of physical uplink shared channel resources or resources of the second set of physical uplink shared channel resources.

The base station communications manager 1215 may also determine a resource configuration for a set of shared physical uplink shared channel resources associated with one or more random access procedures, transmit, to a first UE and a second UE based on the determining, the resource configuration for the set of shared physical uplink shared channel resources, and receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
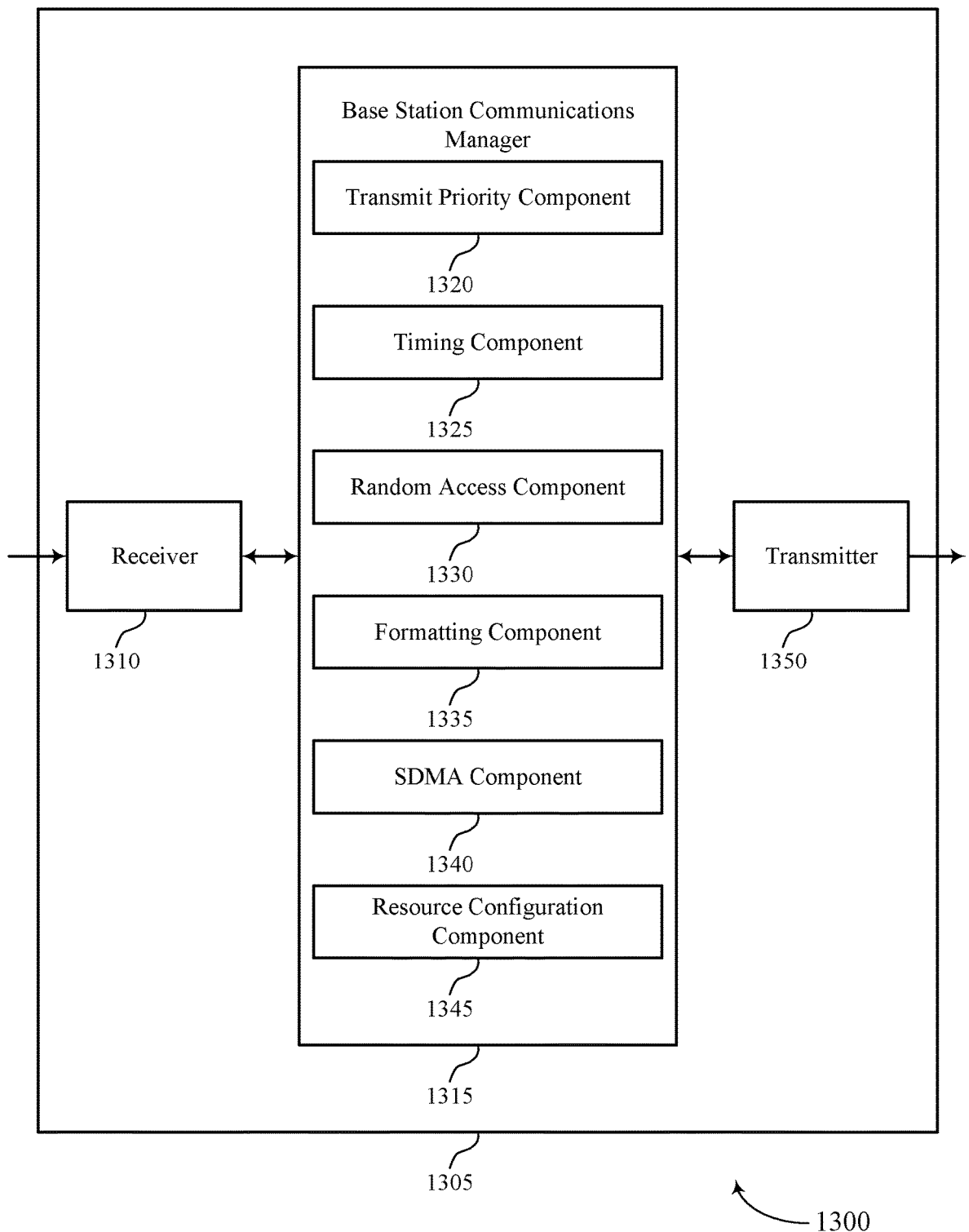

FIG. 13 shows a block diagram 1300 of a device 1305 that supports techniques related to RACH operation in accordance with aspects of the present disclosure. The device 1305 may be an example of aspects of a device 1205, or a base station 105 as described herein. The device 1305 may include a receiver 1310, a base station communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques related to RACH operation). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a transmit priority component 1320, a timing component 1325, a random access component 1330, a formatting component 1335, a SDMA component 1340, and a resource configuration component 1345. The base station communications manager 1315 may be an example of aspects of the base station communications manager 1510 described herein.

The transmit priority component 1320 may transmit, to a UE, an indication of a capability of the base station for communication, the communication having a transmit priority above a threshold.

The timing component 1325 may receive, from the UE based on the indication, a first random access message of a random access procedure, the first random access message indicating a timing configuration for a response window of a downlink channel.

The random access component 1330 may transmit, to the UE during the response window, a second random access message including information for establishing a connection between the UE and the base station. The random access component 1330 may receive, from a UE, a first random access message of a random access procedure, the first random access message including a random access preamble and transmit the second random access message based on the indication. In some examples, the random access component 1330 may receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset.

The formatting component 1335 may determine a format of a second random access message based on the first random access message, the second random access message including an indication of a first set of physical uplink shared channel resources associated with the random access preamble and a second set of physical uplink shared channel resources associated with the random access preamble.

The SDMA component 1340 may receive, based on the second random access message, a third random access message from the UE, the third random access message multiplexed with a fourth random access message from a second UE on resources of the first set of physical uplink shared channel resources or resources of the second set of physical uplink shared channel resources.

The resource configuration component 1345 may determine a resource configuration for a set of shared physical uplink shared channel resources associated with one or more random access procedures and transmit, to a first UE and a second UE based on the determining, the resource configuration for the set of shared physical uplink shared channel resources.

The transmitter 1350 may transmit signals generated by other components of the device 1305. In some examples, the transmitter 1350 may be collocated with a receiver 1310 in a transceiver module. For example, the transmitter 1350 may be an example of aspects of the transceiver 1520 described with reference to FIG. 15. The transmitter 1350 may utilize a single antenna or a set of antennas.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 14:
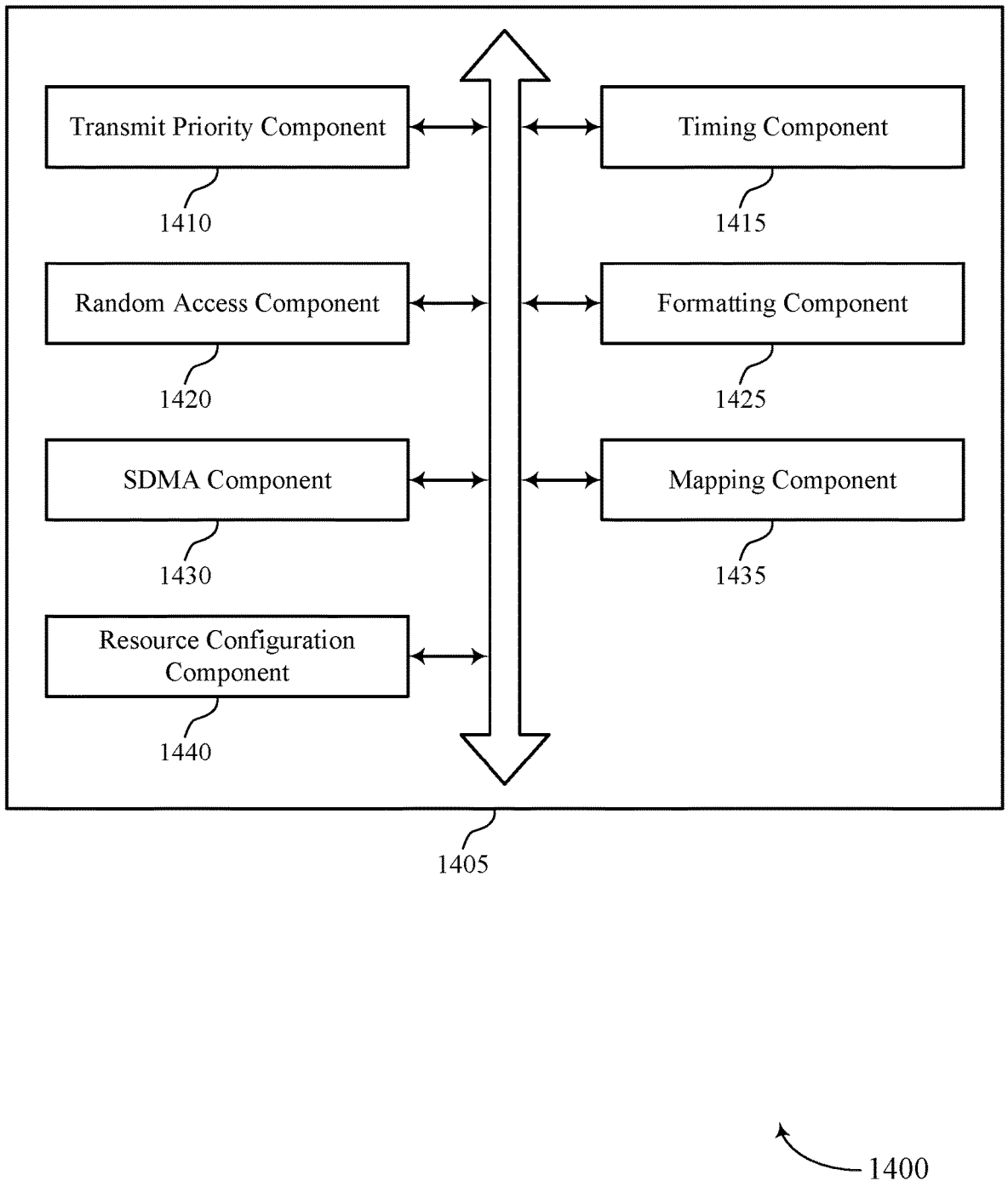
FIG. 14 shows a block diagram of a communications manager that supports techniques related to RACH operation in accordance with aspects of the present disclosure.

FIG. 14 shows a block diagram 1400 of a base station communications manager 1405 that supports techniques related to RACH operation in accordance with aspects of the present disclosure. The base station communications manager 1405 may be an example of aspects of a base station communications manager 1215, a base station communications manager 1315, or a base station communications manager 1510 described herein. The base station communications manager 1405 may include a transmit priority component 1410, a timing component 1415, a random access component 1420, a formatting component 1425, a SDMA component 1430, a mapping component 1435, and a resource configuration component 1440. Each of these modules may communicate, directly or indirectly, with one another (e.g., via one or more buses).

The transmit priority component 1410 may transmit, to a UE, an indication of a capability of the base station for communication, the communication having a transmit priority above a threshold.

The timing component 1415 may receive, from the UE based on the indication, a first random access message of a random access procedure, the first random access message indicating a timing configuration for a response window of a downlink channel. In some examples, the first random access message includes a connection request and a random access preamble, the random access preamble including the timing configuration. In some examples, the first random access message includes a random access preamble and a connection request including the timing configuration.

The random access component 1420 may transmit, to the UE during the response window, a second random access message including information for establishing a connection between the UE and the base station. In some examples, the random access component 1420 may receive, from a UE, a first random access message of a random access procedure, the first random access message including a random access preamble. In some examples, the random access component 1420 may transmit the second random access message based on the indication.

In some examples, the random access component 1420 may receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset. In some examples, the random access component 1420 may transmit a third random access message to the first UE and a fourth random access message to the second UE, the third random access message and the fourth random access message including information for establishing a connection between the respective UE and the base station. In some examples, the random access procedure and the second random access procedure are two-step random access procedures.

The formatting component 1425 may determine a format of a second random access message based on the first random access message, the second random access message including an indication of a first set of physical uplink shared channel resources associated with the random access preamble and a second set of physical uplink shared channel resources associated with the random access preamble.

In some examples, the second random access message indicates the first set of physical uplink shared channel resources, and the second set of physical uplink shared channel resources relative to the first set of physical uplink shared channel resources. In some examples, the second random access message indicates a first index value corresponding to the first set of physical uplink shared channel resources and a second index value corresponding to the second set of physical uplink shared channel resources.

The SDMA component 1430 may receive, based on the second random access message, a third random access message from the UE, the third random access message multiplexed with a fourth random access message from a second UE on resources of the first set of physical uplink shared channel resources or resources of the second set of physical uplink shared channel resources.

In some examples, receiving the third random access message includes receiving signaling over a first set of demodulation reference signal ports different from a second set of demodulation reference signal ports associated with the fourth random access message from the second UE. In some examples, the third random access message is multiplexed with the fourth random access message from the second UE based on a space-division multiple access procedure.

The resource configuration component 1440 may determine a resource configuration for a set of shared physical uplink shared channel resources associated with one or more random access procedures. In some examples, the resource configuration component 1440 may transmit, to a first UE and a second UE based on the determining, the resource configuration for the set of shared physical uplink shared channel resources.

The mapping component 1435 may receive, from the second UE, a first random access message of a second random access procedure, the first random access message including a second random access preamble, where the first set of physical uplink shared channel resources and the second set of physical uplink shared channel resources are associated with the second random access preamble.

In some examples, the mapping component 1435 may identify the first subset of the set of shared physical uplink shared channel resources based on a first random access preamble included in the first random access message. In some examples, the mapping component 1435 may identify the second subset of the set of shared physical uplink shared channel resources based on a second random access preamble included in the second random access message. In some examples, the mapping component 1435 may identify the first subset at a beginning of the set of physical uplink shared channel resources and the second subset at an end of the set of physical uplink shared channel resources.

In some examples, mapping component 1435 may determine the first random access message is associated with a transmit priority above a threshold, where the first subset includes resources of the set of shared physical uplink shared channel resources that precede the second subset. In some examples, the first subset includes resources of the second set of physical uplink shared channel resources that precede the second subset. In some examples, mapping component 1435 may determine the second random access message is associated with a transmit priority above a threshold, where the second subset includes resources of the set of shared physical uplink shared channel resources that precede the first subset. In some examples, the second subset includes resources of the second set of physical uplink shared channel resources that precede the first subset.

The base station communications manager 1405, or its sub-components, may be implemented in hardware, code (e.g., software or firmware) executed by a processor, or any combination thereof. If implemented in code executed by a processor, the functions of the base station communications manager 1405, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1405, or its sub-components, may be physically located at various positions, including being distributed such that portions of functions are implemented at different physical locations by one or more physical components. In some examples, the base station communications manager 1405, or its sub-components, may be a separate and distinct component in accordance with various aspects of the present disclosure. In some examples, the base station communications manager 1405, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 15:
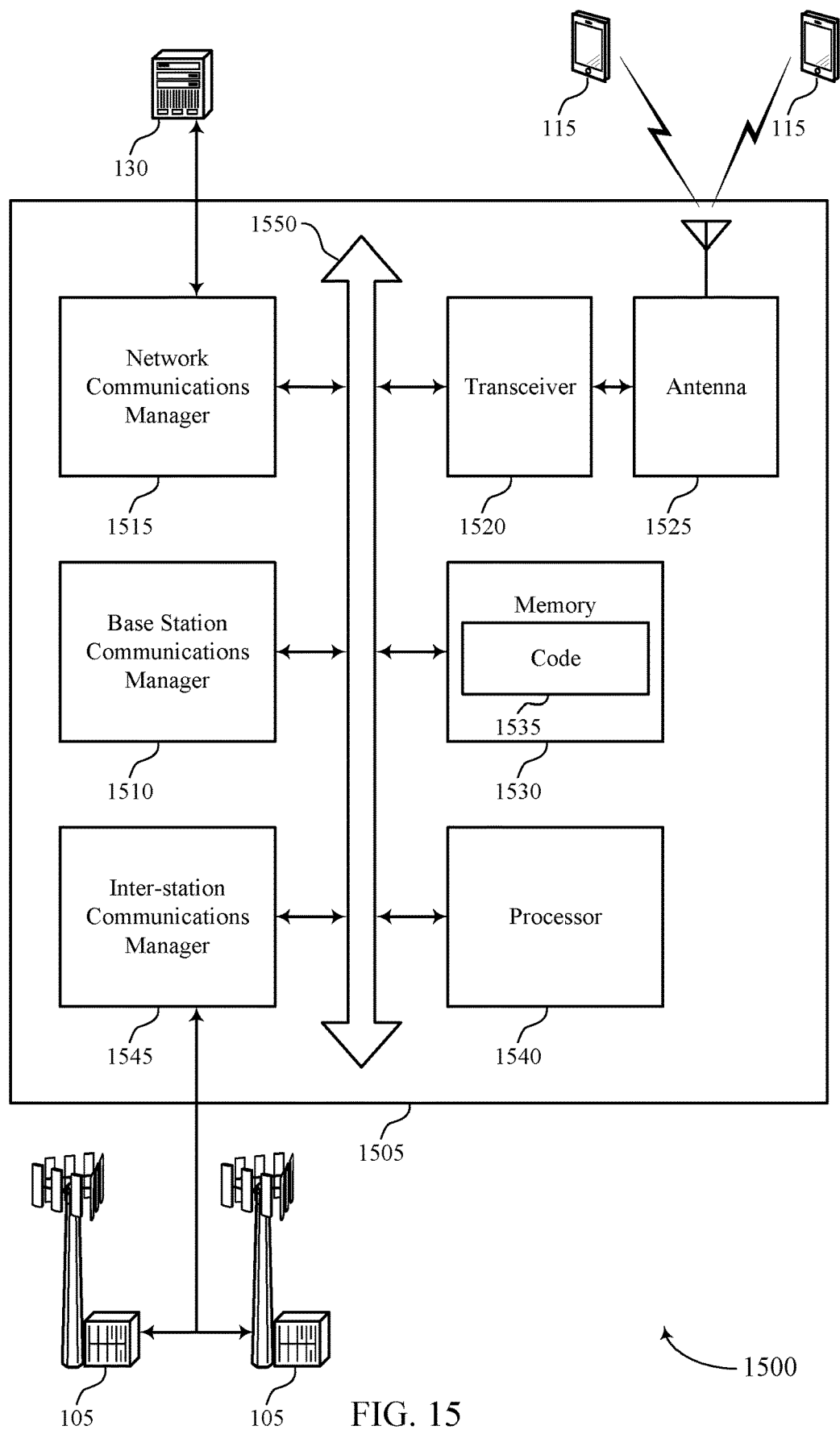
FIG. 15 shows a diagram of a system including a device that supports techniques related to RACH operation in accordance with aspects of the present disclosure.

FIG. 15 shows a diagram of a system 1500 including a device 1505 that supports techniques related to RACH operation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network base station communications manager 1515, a transceiver 1520, an antenna 1525, memory 1530, a processor 1540, and an inter-station base station communications manager 1545. These components may be in electronic communication via one or more buses (e.g., bus 1550).

The base station communications manager 1510 may transmit, to a UE, an indication of a capability of the base station for communication, the communication having a transmit priority above a threshold, receive, from the UE based on the indication, a first random access message of a random access procedure, the first random access message indicating a timing configuration for a response window of a downlink channel, and transmit, to the UE during the response window, a second random access message including information for establishing a connection between the UE and the base station.

The base station communications manager 1510 may also receive, from a UE, a first random access message of a random access procedure, the first random access message including a random access preamble, transmit the second random access message based on the indication, determine a format of a second random access message based on the first random access message, the second random access message including an indication of a first set of physical uplink shared channel resources associated with the random access preamble and a second set of physical uplink shared channel resources associated with the random access preamble, and receive, based on the second random access message, a third random access message from the UE, the third random access message multiplexed with a fourth random access message from a second UE on resources of the first set of physical uplink shared channel resources or resources of the second set of physical uplink shared channel resources.

The base station communications manager 1510 may also determine a resource configuration for a set of shared physical uplink shared channel resources associated with one or more random access procedures, transmit, to a first UE and a second UE based on the determining, the resource configuration for the set of shared physical uplink shared channel resources, and receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset.

The base station communications manager 1510, or its sub-components, may be implemented in hardware, code (e.g., software or firmware) executed by a processor, or any combination thereof. If implemented in code executed by a processor, the functions of the base station communications manager 1510, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1510, or its sub-components, may be physically located at various positions, including being distributed such that portions of functions are implemented at different physical locations by one or more physical components. In some examples, the base station communications manager 1510, or its sub-components, may be a separate and distinct component in accordance with various aspects of the present disclosure. In some examples, the base station communications manager 1510, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some examples, the wireless device may include a single antenna 1525. However, in some examples the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some examples, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory array using a memory controller. In some examples, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques related to RACH operation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some examples, the code 1535 may not be directly executable by the processor 1540 but may cause a computer (e.g., when compiled and executed) to perform functions described herein.

Figure 16:
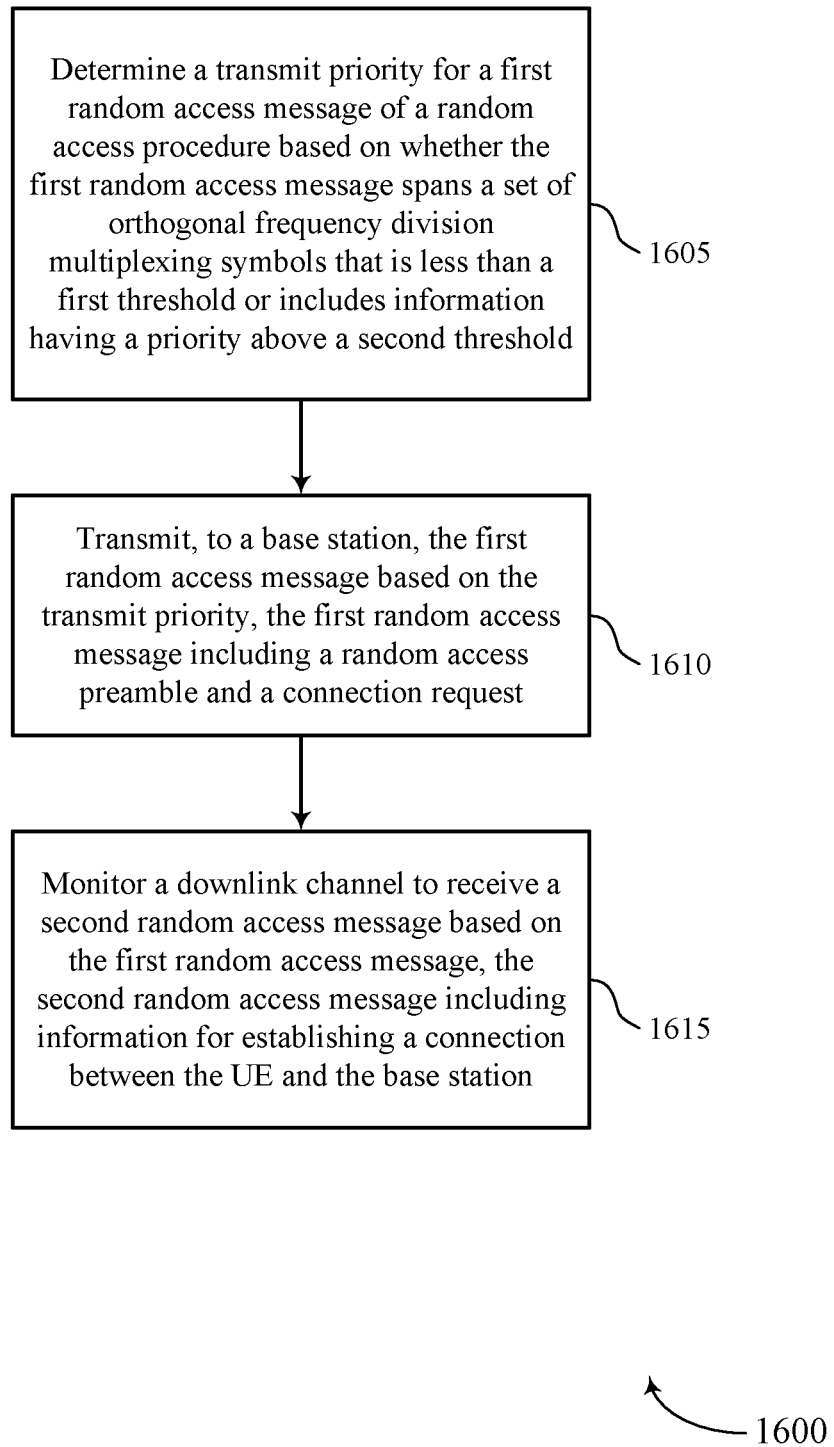
FIGS. 16-22 show flowcharts illustrating methods that support techniques related to RACH operation in accordance with aspects of the present disclosure.

FIG. 16 shows a flowchart illustrating a method 1600 that supports techniques related to RACH operation in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may determine a transmit priority for a first random access message of a random access procedure based on whether the first random access message spans a set of orthogonal frequency division multiplexing symbols that is less than a first threshold or includes information having a priority above a second threshold. The operations of 1605 may be performed according to the methods described herein. In some examples, aspects of the operations of 1605 may be performed by a transmit priority component as described with reference to FIGS. 8 through 11.

At 1610, the UE may transmit, to a base station, the first random access message based on the transmit priority, the first random access message including a random access preamble and a connection request. The operations of 1610 may be performed according to the methods described herein. In some examples, aspects of the operations of 1610 may be performed by a random access component as described with reference to FIGS. 8 through 11.

At 1615, the UE may monitor a downlink channel to receive a second random access message based on the first random access message, the second random access message including information for establishing a connection between the UE and the base station. The operations of 1615 may be performed according to the methods described herein. In some examples, aspects of the operations of 1615 may be performed by a monitoring component as described with reference to FIGS. 8 through 11.

Figure 17:
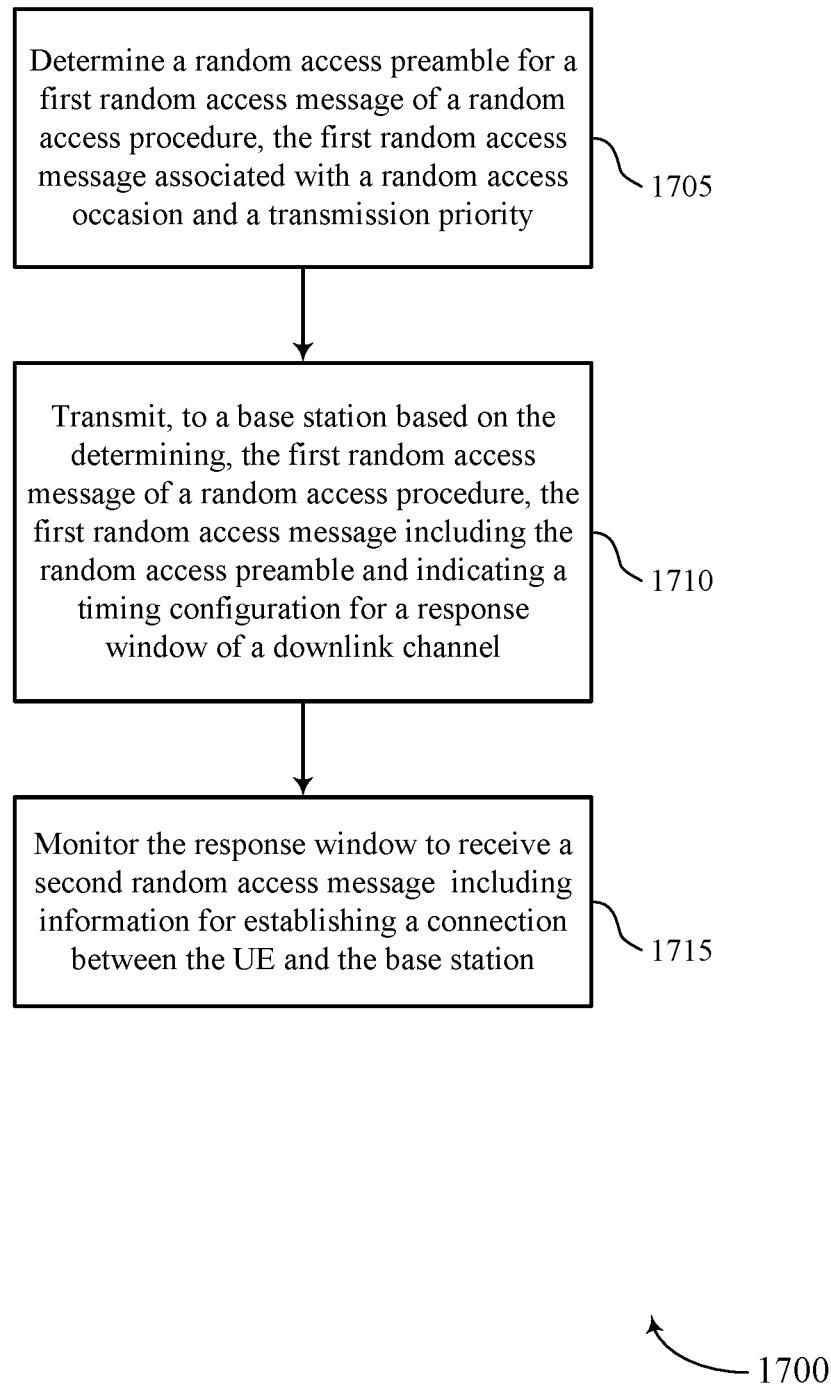

FIG. 17 shows a flowchart illustrating a method 1700 that supports techniques related to RACH operation in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may determine a random access preamble for a first random access message of a random access procedure, the first random access message associated with a random access occasion and a transmission priority. The operations of 1705 may be performed according to the methods described herein. In some examples, aspects of the operations of 1705 may be performed by a preamble component as described with reference to FIGS. 8 through 11.

At 1710, the UE may transmit, to a base station based on the determining, the first random access message of a random access procedure, the first random access message including the random access preamble and indicating a timing configuration for a response window of a downlink channel. The operations of 1710 may be performed according to the methods described herein. In some examples, aspects of the operations of 1710 may be performed by a random access component as described with reference to FIGS. 8 through 11.

At 1715, the UE may monitor the response window to receive a second random access message including information for establishing a connection between the UE and the base station. The operations of 1715 may be performed according to the methods described herein. In some examples, aspects of the operations of 1715 may be performed by a monitoring component as described with reference to FIGS. 8 through 11.

Figure 18:
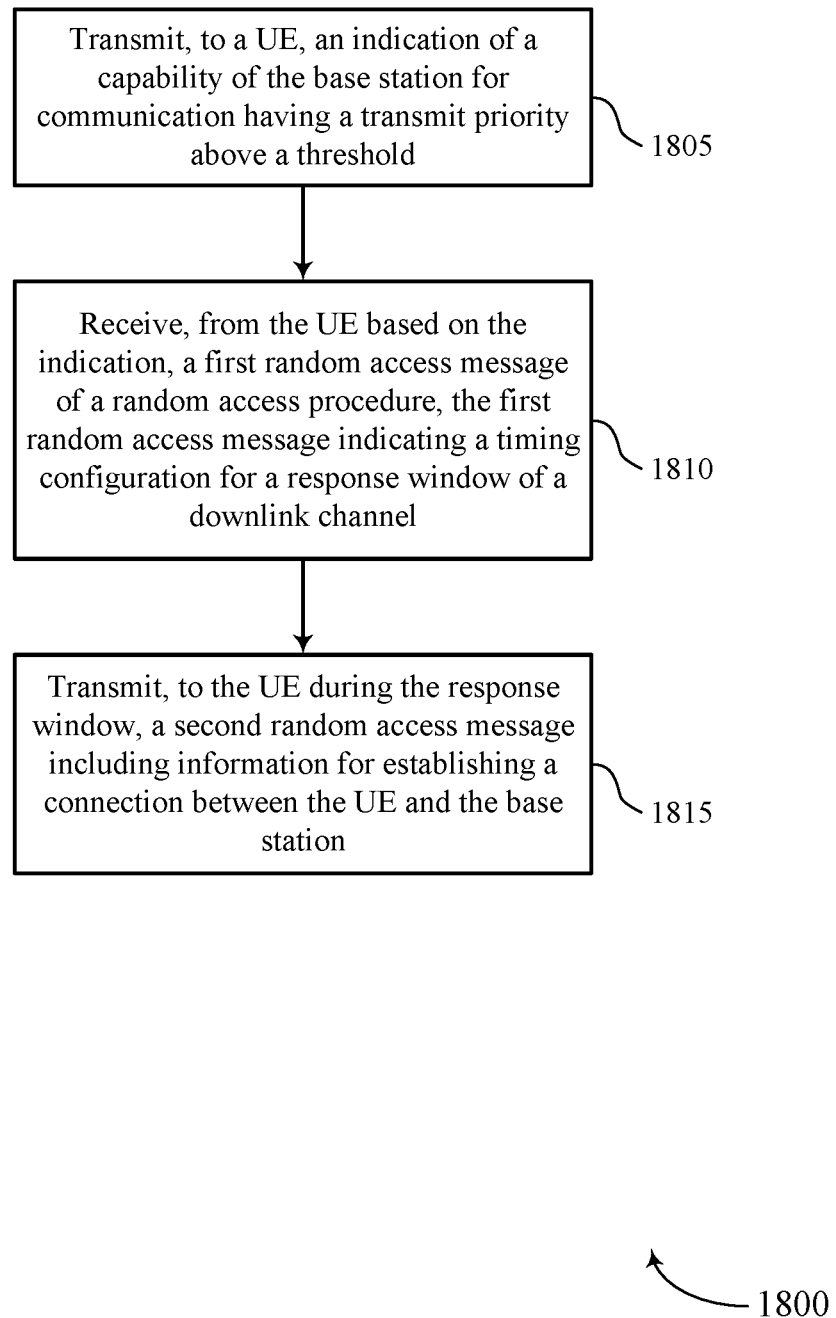

FIG. 18 shows a flowchart illustrating a method 1800 that supports techniques related to RACH operation in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, an indication of a capability of the base station for communication, the communication having a transmit priority above a threshold. The operations of 1805 may be performed according to the methods described herein. In some examples, aspects of the operations of 1805 may be performed by a transmit priority component as described with reference to FIGS. 12 through 15.

At 1810, the base station may receive, from the UE based on the indication, a first random access message of a random access procedure, the first random access message indicating a timing configuration for a response window of a downlink channel. The operations of 1810 may be performed according to the methods described herein. In some examples, aspects of the operations of 1810 may be performed by a timing component as described with reference to FIGS. 12 through 15.

At 1815, the base station may transmit, to the UE during the response window, a second random access message including information for establishing a connection between the UE and the base station. The operations of 1815 may be performed according to the methods described herein. In some examples, aspects of the operations of 1815 may be performed by a random access component as described with reference to FIGS. 12 through 15.

Figure 19:
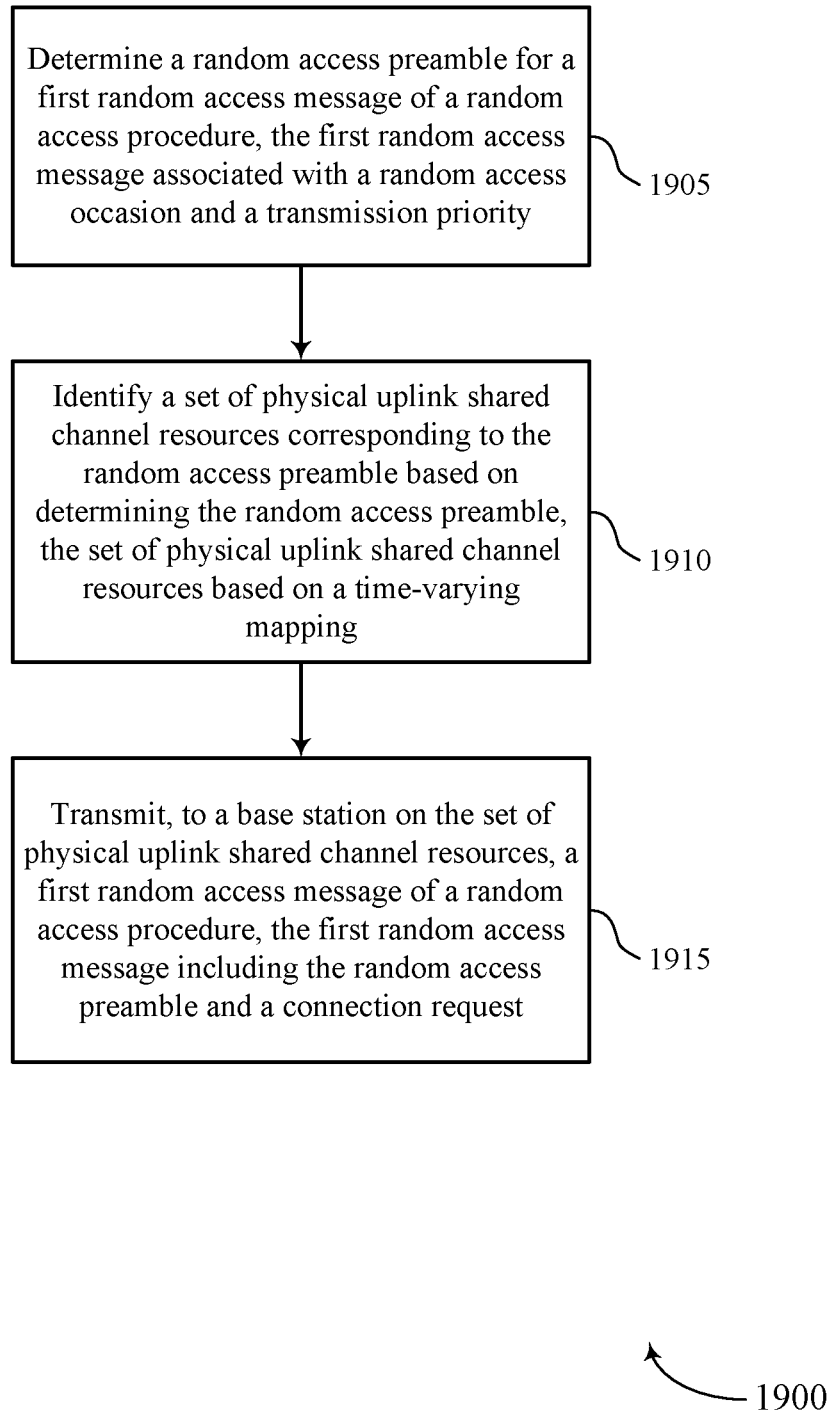

FIG. 19 shows a flowchart illustrating a method 1900 that supports techniques related to RACH operation in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1905, the UE may determine a random access preamble for a first random access message of a random access procedure, the first random access message associated with a random access occasion and a transmission priority. The operations of 1905 may be performed according to the methods described herein. In some examples, aspects of the operations of 1905 may be performed by a preamble component as described with reference to FIGS. 8 through 11.

At 1910, the UE may identify a set of physical uplink shared channel resources corresponding to the random access preamble based on determining the random access preamble, the set of physical uplink shared channel resources based on a time-varying mapping. The operations of 1910 may be performed according to the methods described herein. In some examples, aspects of the operations of 1910 may be performed by a mapping component as described with reference to FIGS. 8 through 11.

At 1915, the UE may transmit, to a base station on the set of physical uplink shared channel resources, a first random access message of a random access procedure, the first random access message including a connection request and the random access preamble. The operations of 1915 may be performed according to the methods described herein. In some examples, aspects of the operations of 1915 may be performed by a random access component as described with reference to FIGS. 8 through 11.

Figure 20:
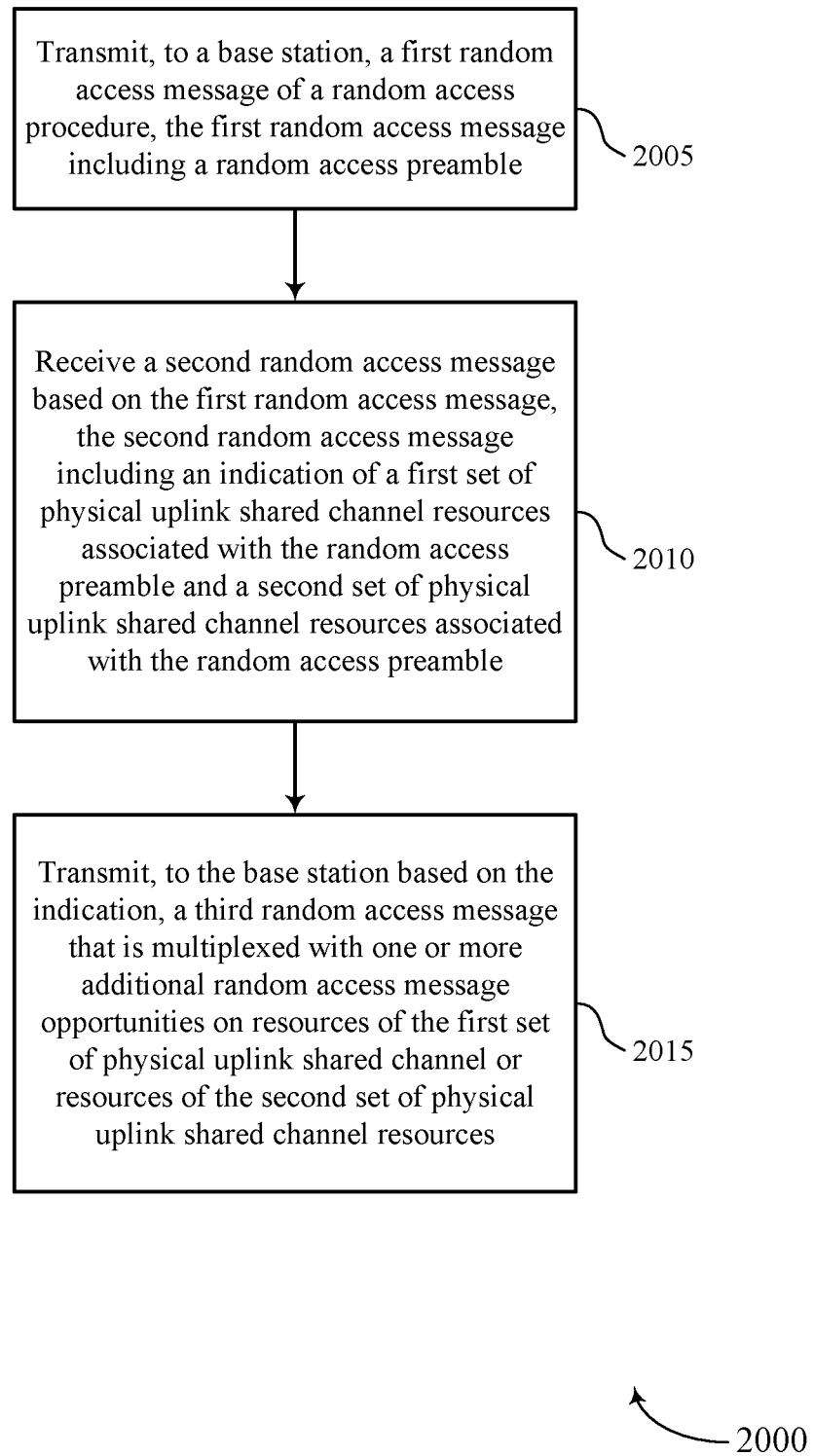

FIG. 20 shows a flowchart illustrating a method 2000 that supports techniques related to RACH operation in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 2005, the UE may transmit, to a base station, a first random access message of a random access procedure, the first random access message including a random access preamble. The operations of 2005 may be performed according to the methods described herein. In some examples, aspects of the operations of 2005 may be performed by a random access component as described with reference to FIGS. 8 through 11.

At 2010, the UE may receive a second random access message based on the first random access message, the second random access message including an indication of a first set of physical uplink shared channel resources associated with the random access preamble and a second set of physical uplink shared channel resources associated with the random access preamble. The operations of 2010 may be performed according to the methods described herein. In some examples, aspects of the operations of 2010 may be performed by a mapping component as described with reference to FIGS. 8 through 11.

At 2015, the UE may transmit, to the base station based on the indication, a third random access message that is multiplexed with one or more additional random access message opportunities on resources of the first set of physical uplink shared channel or resources of the second set of physical uplink shared channel resources. The operations of 2015 may be performed according to the methods described herein. In some examples, aspects of the operations of 2015 may be performed by a SDMA component as described with reference to FIGS. 8 through 11.

Figure 21:
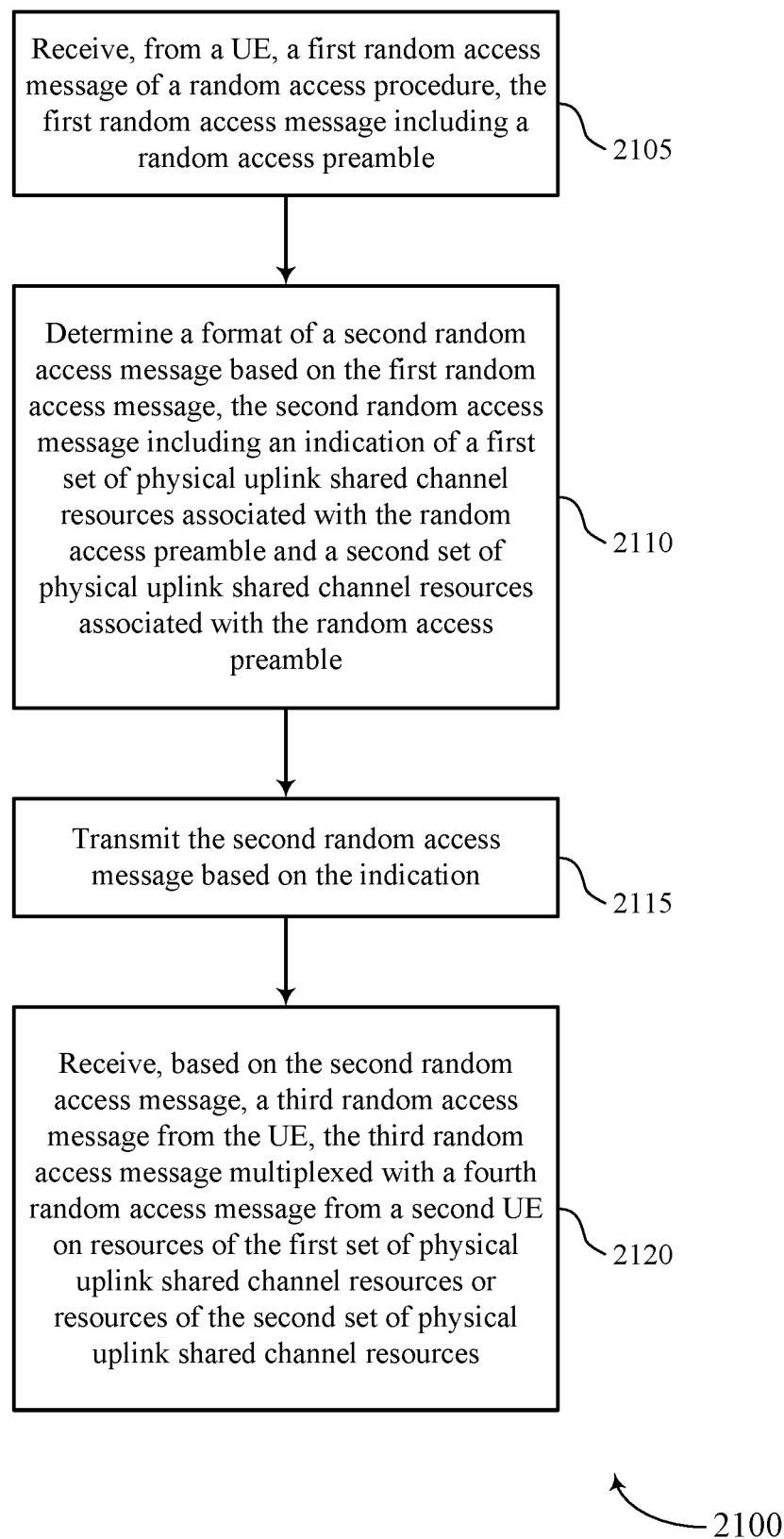

FIG. 21 shows a flowchart illustrating a method 2100 that supports techniques related to RACH operation in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2105, the base station may receive, from a UE, a first random access message of a random access procedure, the first random access message including a random access preamble. The operations of 2105 may be performed according to the methods described herein. In some examples, aspects of the operations of 2105 may be performed by a random access component as described with reference to FIGS. 12 through 15.

At 2110, the base station may determine a format of a second random access message based on the first random access message, the second random access message including an indication of a first set of physical uplink shared channel resources associated with the random access preamble and a second set of physical uplink shared channel resources associated with the random access preamble. The operations of 2110 may be performed according to the methods described herein. In some examples, aspects of the operations of 2110 may be performed by a formatting component as described with reference to FIGS. 12 through 15.

At 2115, the base station may transmit the second random access message based on the indication. The operations of 2115 may be performed according to the methods described herein. In some examples, aspects of the operations of 2115 may be performed by a random access component as described with reference to FIGS. 12 through 15.

At 2120, the base station may receive, based on the second random access message, a third random access message from the UE, the third random access message multiplexed with a fourth random access message from a second UE on resources of the first set of physical uplink shared channel resources or resources of the second set of physical uplink shared channel resources. The operations of 2120 may be performed according to the methods described herein. In some examples, aspects of the operations of 2120 may be performed by a SDMA component as described with reference to FIGS. 12 through 15.

Figure 22:
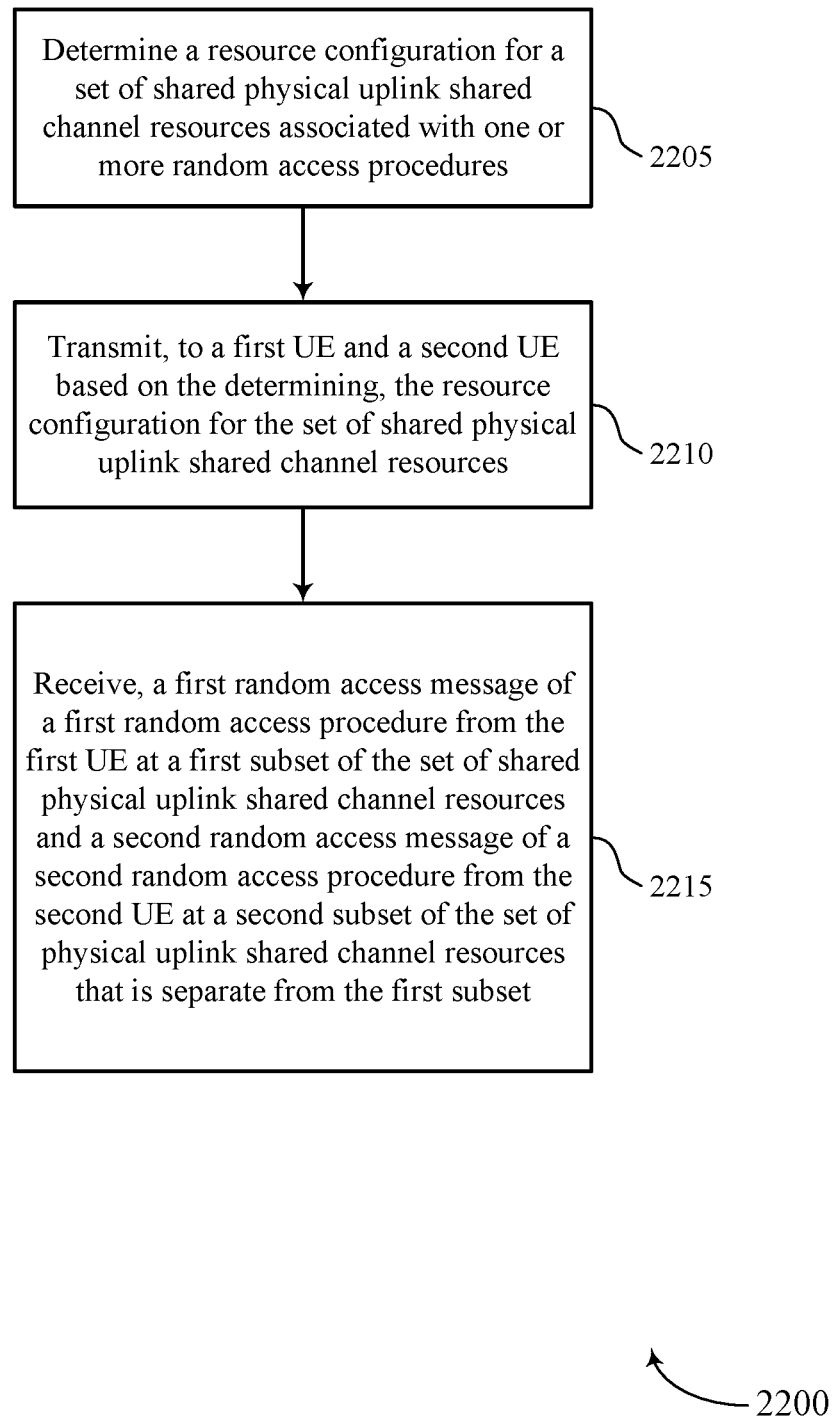

FIG. 22 shows a flowchart illustrating a method 2200 that supports techniques related to RACH operation in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2205, the base station may determine a resource configuration for a set of shared physical uplink shared channel resources associated with one or more random access procedures. The operations of 2205 may be performed according to the methods described herein. In some examples, aspects of the operations of 2205 may be performed by a resource configuration component as described with reference to FIGS. 12 through 15.

At 2210, the base station may transmit, to a first UE and a second UE based on the determining, the resource configuration for the set of shared physical uplink shared channel resources. The operations of 2210 may be performed according to the methods described herein. In some examples, aspects of the operations of 2210 may be performed by a resource configuration component as described with reference to FIGS. 12 through 15.

At 2215, the base station may receive, a first random access message of a first random access procedure from the first UE at a first subset of the set of shared physical uplink shared channel resources and a second random access message of a second random access procedure from the second UE at a second subset of the set of physical uplink shared channel resources that is separate from the first subset. The operations of 2215 may be performed according to the methods described herein. In some examples, aspects of the operations of 2215 may be performed by a random access component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining a transmit power for a first random access message that comprises a physical random access channel transmission and a physical uplink shared channel transmission, wherein determining the transmit power comprises determining a first transmit power for the physical random access channel transmission and a second transmit power for the physical uplink shared channel transmission based at least in part on a first priority of the physical random access channel transmission, a second priority of the physical uplink shared channel transmission, and a transmit power allocation of the UE;
   transmitting the first random access message in a random access channel occasion using the determined transmit power; and
   monitoring for a second random access message in accordance with a random access procedure and based at least in part on transmitting the first random access message, the second random access message comprising a random access response grant.

2. The method of claim 1, further comprising:
   determining that a quantity of orthogonal frequency division multiplexing symbols in the random access channel occasion is less than a threshold, wherein determining the transmit power for the first random access message is based at least in part on determining that the quantity of orthogonal frequency division multiplexing symbols is less than the threshold.

3. The method of claim 2, wherein a combination of the physical random access channel transmission, a gap period, and the physical uplink shared channel transmission spans the quantity of orthogonal frequency division multiplexing symbols in the random access channel occasion.

4. The method of claim 1, further comprising:
determining that the first random access message comprises information with a priority above a threshold based at least in part on one or more of a preamble partition, the random access channel occasion, or a signaling indication, wherein determining the transmit power for the first random access message is based at least in part on determining that the priority of the information in the first random access message is above the threshold.

5. The method of claim 1, wherein determining the transmit power for the first random access message further comprises:
determining the first transmit power for the physical random access channel transmission based at least in part on the first priority of the physical random access channel transmission; and
determining the second transmit power for the physical uplink shared channel transmission based at least in part on the second priority of the physical uplink shared channel transmission, wherein the first priority of the physical random access channel transmission is higher than the second priority of the physical uplink shared channel transmission.

6. The method of claim 1, wherein:
the first priority of the physical random access channel transmission corresponds to a highest priority; and
the first transmit power for the physical uplink shared channel transmission is higher than the second transmit power for the physical uplink shared channel transmission.

7. The method of claim 1, wherein:
the first random access message is transmitted on a primary cell; and
the second random access message comprises the random access response grant and a connection setup message for the random access procedure.

8. The method of claim 1, wherein the random access procedure is a two-step random access procedure.

9. The method of claim 1, further comprising:
determining a third transmit power for an uplink transmission based at least in part on a carrier aggregation configuration of the UE, the first priority of the physical random access channel transmission, the second priority of the physical uplink shared channel transmission, a third priority of the uplink transmission, the transmit power allocation of the UE, or a combination thereof; and
transmitting the uplink transmission on a secondary cell using the third transmit power, wherein the uplink transmission and one or both of the physical random access channel transmission or the physical uplink shared channel transmission span a set of orthogonal frequency division multiplexing symbols.

10. The method of claim 9, wherein the uplink transmission comprises one or more of a second physical uplink shared channel transmission, a second physical random access channel transmission, a physical uplink control channel transmission, or a sounding reference signal transmission.

11. An apparatus for wireless communication at a user equipment (UE), comprising:
a processor;
memory coupled with the processor; and
instructions stored in the memory and executable by the processor to cause the apparatus to:
determine a transmit power for a first random access message that comprises a physical random access channel transmission and a physical uplink shared channel transmission, wherein the instructions to determine the transmit power are executable by the processor to cause the apparatus to determine a first transmit power for the physical random access channel transmission and a second transmit power for the physical uplink shared channel transmission based at least in part on a first priority of the physical random access channel transmission, a second priority of the physical uplink shared channel transmission, and a transmit power allocation of the UE;
transmit the first random access message in a random access channel occasion using the determined transmit power; and
monitor for a second random access message in accordance with a random access procedure and based at least in part on transmitting the first random access message, the second random access message comprising a random access response grant.

12. The apparatus of claim 11, wherein the instructions are further executable by the processor to cause the apparatus to:
determine that a quantity of orthogonal frequency division multiplexing symbols in the random access channel occasion is less than a threshold, wherein the instructions to determine the transmit power for the first random access message are executable by the processor to cause the apparatus to determine the transmit power for the first random access message based at least in part on the quantity of orthogonal frequency division multiplexing symbols being less than the threshold.

13. The apparatus of claim 12, wherein a combination of the physical random access channel transmission, a gap period, and the physical uplink shared channel transmission spans the quantity of orthogonal frequency division multiplexing symbols in the random access channel occasion.

14. The apparatus of claim 11, wherein the instructions are further executable by the processor to cause the apparatus to:
determine that the first random access message comprises information with a priority above a threshold based at least in part on one or more of a preamble partition, the random access channel occasion, or a signaling indication, wherein the instructions to determine the transmit power for the first random access message are executable by the processor to cause the apparatus to determine the transmit power for the first random access message based at least in part on the priority of the information in the first random access message being above the threshold.

15. The apparatus of claim 11, wherein the instructions to determine the transmit power for the first random access message are further executable by the processor to cause the apparatus to:
determine the first transmit power for the physical random access channel transmission based at least in part on the first priority of the physical random access channel transmission; and
determine the second transmit power for the physical uplink shared channel transmission based at least in part on the second priority of the physical uplink shared channel transmission, wherein the first priority of the physical random access channel transmission is higher than the second priority of the physical uplink shared channel transmission.

16. The apparatus of claim 11, wherein:
the first priority of the physical random access channel transmission corresponds to a highest priority; and
the first transmit power for the physical random access channel transmission is higher than the second transmit power for the physical uplink shared channel transmission.

17. The apparatus of claim 11, wherein:
the first random access message is transmitted on a primary cell; and
the second random access message comprises the random access response grant and a connection setup message for the random access procedure.

18. The apparatus of claim 11, wherein the random access procedure is a two-step random access procedure.

19. The apparatus of claim 11, wherein the instructions are further executable by the processor to cause the apparatus to:
determine a third transmit power for an uplink transmission based at least in part on a carrier aggregation configuration of the UE, the first priority of the physical random access channel transmission, the second priority of the physical uplink shared channel transmission, a third priority of the uplink transmission, the transmit power allocation of the UE, or a combination thereof; and
transmit the uplink transmission on a secondary cell using the third transmit power, wherein the uplink transmission and one or both of the physical random access channel transmission or the physical uplink shared channel transmission span a set of orthogonal frequency division multiplexing symbols.

20. The apparatus of claim 19, wherein the uplink transmission comprises one or more of a second physical uplink shared channel transmission, a second physical random access channel transmission, a physical uplink control channel transmission, or a sounding reference signal transmission.

21. An apparatus for wireless communication at a user equipment (UE), comprising:
means for determining a transmit power for a first random access message that comprises a physical random access channel transmission and a physical uplink shared channel transmission, wherein determining the transmit power comprises determining a first transmit power for the physical random access channel transmission and a second transmit power for the physical uplink shared channel transmission based at least in part on a first priority of the physical random access channel transmission, a second priority of the physical uplink shared channel transmission, and a transmit power allocation of the UE;
means for transmitting the first random access message in a random access channel occasion using the determined transmit power; and
means for monitoring for a second random access message in accordance with a random access procedure and based at least in part on transmitting the first random access message, the second random access message comprising a random access response grant.

22. The apparatus of claim 21, further comprising:
means for determining that a quantity of orthogonal frequency division multiplexing symbols in the random access channel occasion is less than a threshold, wherein determining the transmit power for the first random access message is based at least in part on determining that the quantity of orthogonal frequency division multiplexing symbols is less than the threshold.

23. The apparatus of claim 22, wherein a combination of the physical random access channel transmission, a gap period, and the physical uplink shared channel transmission spans the quantity of orthogonal frequency division multiplexing symbols in the random access channel occasion.

24. The apparatus of claim 21, further comprising:
means for determining that the first random access message comprises information with a priority above a threshold based at least in part on one or more of a preamble partition, the random access channel occasion, or a signaling indication, wherein determining the transmit power for the first random access message is based at least in part on determining that the priority of the information in the first random access message is above the threshold.

25. The apparatus of claim 21, wherein the means for determining the transmit power for the first random access message further comprise:
means for determining the first transmit power for the physical random access channel transmission based at least in part on the first priority of the physical random access channel transmission; and
means for determining the second transmit power for the physical uplink shared channel transmission based at least in part on the second priority of the physical uplink shared channel transmission, wherein the first priority of the physical random access channel transmission is higher than the second priority of the physical uplink shared channel transmission.

26. The apparatus of claim 21, wherein:
the first priority of the physical random access channel transmission corresponds to a highest priority; and
the first transmit power for the physical random access channel transmission is higher than the second transmit power for the physical uplink shared channel transmission.

27. The apparatus of claim 21, wherein:
the first random access message is transmitted on a primary cell; and
the second random access message comprises the random access response grant and a connection setup message for the random access procedure.

28. The apparatus of claim 21, further comprising:
means for determining a third transmit power for an uplink transmission based at least in part on a carrier aggregation configuration of the UE, the first priority of the physical random access channel transmission, the second priority of the physical uplink shared channel transmission, a third priority of the uplink transmission, the transmit power allocation of the UE, or a combination thereof; and
means for transmitting the uplink transmission on a secondary cell using the third transmit power, wherein the uplink transmission and one or both of the physical random access channel transmission or the physical uplink shared channel transmission span a set of orthogonal frequency division multiplexing symbols.

29. The apparatus of claim 28, wherein the uplink transmission comprises one or more of a second physical uplink shared channel transmission, a second physical random access channel transmission, a physical uplink control channel transmission, or a sounding reference signal transmission.

30. A non-transitory computer-readable medium storing code for wireless communication at a user equipment (UE), the code comprising instructions executable by a processor to cause the UE to:
- determine a transmit power for a first random access message that comprises a physical random access channel transmission and a physical uplink shared channel transmission, wherein the instructions to determine the transmit power are executable by the processor to cause the UE to determine a first transmit power for the physical random access channel transmission and a second transmit power for the physical uplink shared channel transmission based at least in part on a first priority of the physical random access channel transmission, a second priority of the physical uplink shared channel transmission, and a transmit power allocation of the UE;
- transmit the first random access message in a random access channel occasion using the determined transmit power; and
- monitor for a second random access message in accordance with a random access procedure and based at least in part on transmitting the first random access message, the second random access message comprising a random access response grant.

* * * * *